(12) United States Patent
Ontalus et al.

(10) Patent No.: US 7,337,033 B1
(45) Date of Patent: Feb. 26, 2008

(54) DATA MINING TO DETECT PERFORMANCE QUALITY OF TOOLS USED REPETITIVELY IN MANUFACTURING

(75) Inventors: Viorel Ontalus, Danbury, CT (US); Jeong Woo Nam, Poughquag, NY (US); Yunsheng Song, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/460,723

(22) Filed: Jul. 28, 2006

(51) Int. Cl.
*G06F 19/00* (2006.01)
(52) U.S. Cl. .................. 700/109; 700/174; 702/82; 702/183
(58) Field of Classification Search .............. 700/108, 700/109, 110, 174, 175; 702/81, 82, 83, 702/84, 182, 183, 184, 185; 706/25, 45; 707/1, 10, 100
See application file for complete search history.

(56) References Cited

U.S. PATENT DOCUMENTS

| | | | |
|---|---|---|---|
| 6,820,070 B2 | 11/2004 | Goldman et al. | |
| 6,965,895 B2* | 11/2005 | Smith et al. | 707/10 |
| 7,008,300 B1* | 3/2006 | Molnar | 700/121 |
| 2002/0193899 A1 | 12/2002 | Shanmugasundram et al. | |
| 2003/0061212 A1* | 3/2003 | Smith et al. | 707/6 |
| 2003/0182252 A1* | 9/2003 | Beinglass et al. | 706/45 |
| 2005/0222817 A1 | 10/2005 | Achacoso et al. | |
| 2006/0064188 A1 | 3/2006 | Ushiku et al. | |

* cited by examiner

*Primary Examiner*—Kidest Bahta
*Assistant Examiner*—Charles Kasenge
(74) *Attorney, Agent, or Firm*—Graham S. Jones, III; H. Daniel Schnurmann

(57) ABSTRACT

A tool with one or more chambers in a manufacturing system is identified as performing at or below an acceptable level by the following steps. Store process data from tools for each one of a plurality of individual processes for a processed object in a process database. Store tool performance data for each individual process for a processed object in a yield database. Develop statistics for similar tool sets associating data with each of the similar tool units. Generate yield numbers for each group of the similar tool units based upon the statistics. Identify poorly/well performing tool units by using the yield numbers.

19 Claims, 16 Drawing Sheets

| ANY GOOD YIELD | | |
|---|---|---|
| Categorize the inputs as follows: | | |
| | good | the input is inSpec |
| | bad | the input is specLow, specHigh |
| | absent | the input is missing or screened-- |
| The result is computed as | | |
| | pass(value=1.0) | if no absent input and any is good |
| | fail (value=0.0) | if no absent input and all are bad |
| | missing | if all inputs are absent |
| AVERAGE YIELD | | |
| | G=Sum | if no absent input and any is good |
| | S=Sum | if no absent input and all are bad |
| | Method | SpecYield =Sum(G) / I Sum(S) |
| CHIP PERFECT YIELD | | |
| Categorize the inputs as follows: | | |
| | good | the input is inSpec |
| | bad | the input is specLow, specHigh |
| | absent | the input is missing or screened-- |
| The result is computed as: | | |
| | pass(value=1.0) | if all non absent are good |
| | fail (value=0.0) | if any input is bad |
| | missing | if all inputs are absent |
| CHIP PERFECTYIELD NO INCOMPLETE CHIPS | | |
| Categorize the inputs as follows: | | |
| | -good | the input is inSpec |
| | bad | the input is specLow, specHigh |
| | absent | the input is missing or screened-- |
| The result is computed as: | | |
| | pass(value=1.0) | if no absent input and all are good |
| | fail (value=0.0) | if no absent input and any are bad |
| | missing | if any input is absent |

FIG. 15

DATA MINING TO DETECT PERFORMANCE QUALITY OF TOOLS USED REPETITIVELY IN MANUFACTURING

BACKGROUND OF THE INVENTION

This invention relates to the identification of tools or tool chambers producing defective products in a multiple tool manufacturing environment where those tools are reused in successive stages of manufacture of a single product. More particularly, the present invention relates to computer implemented methods and systems for storing and analyzing product history and failure data to determine which tools produce defective products when reused in that manner.

FIG. 1A is a diagram 2 of a manufacturing process flow of processing steps employed in the manufacture of microelectronic devices comprising semiconductor chips. The diagram 2 illustrates a series of cycles of processing steps starting with a set of Front End Of Line (FEOL) block 3 of processing steps and continuing until the end of a set of Back End Of Line (BEOL) block 4 of processing steps. Below the FEOL block 3 and BEOL block 4 is a chart showing the metallization process phases from the metal layer phase 1, through to the last three metallization phases N−1, N and N+1. The semiconductor devices are formed in the FEOL process steps and then preferably consecutively metal layer 1, . . . metal layer N−1, metal layer N, and through N+1 are formed in the BEOL processing.

To simplify the description it is assumed that the processing occurs in several cycles of consecutive sequence processing steps which are repeated several times to form the metallization layers required on a semiconductor device. That is to say that several consecutive processing steps are performed repeatedly. The processing is performed at stages each of which includes several tools (hereinafter referring to both individual tools and chambers in multi-chamber tools). The various stages perform functions such as deposition of metal, deposition of dielectric layers, patterning (forming masks), and etching by a process such as Reactive Ion Etching (RIE). While the method of this invention does not require repetition of the processing sequence, the description included herein relates to repeated cycling through the same sequence of tool stages. It will be well understood by those skilled in the art that the sequence of processing and the tools employed may vary considerably, and that the present invention can be applied to such diverse sequences of operation as well.

In many cases in the manufacture of semiconductor devices, similar process steps are repeated several times during a product manufacturing cycle and a common set of tools is reused for each of such similar process steps. In order to enhance the yield of manufacturing of semiconductor devices, it is necessary to identify a bad tool or a tool that is under-performing, but also to identify the best performing tools. Furthermore it is desirable to determine which one of the chambers of a multi-chamber tool is bad, i.e. under-performing. It is also desirable to determine which ones of the tools (chambers) is one of the best performing units on factory floor. Heretofore the state of the art methods employed for detecting under-performing tools in manufacturing were based on uni-process analysis. A common method of analysis has been to monitor the yield for each process step individually and to identify the tool performance based upon that data. However in a very complex process where very large numbers of steps are performed without the ability of being able to monitor the yield for each process step, the problem of determining the level of performance of each individual tool has become a difficult problem.

Referring to FIG. 1B, a system 10 is shown for performing data collection from a series of workpieces W being manufactured on a factory floor 12 which includes a set of tools 12-1 to 12-4, a Data Collection Processor (DCP) 15 and a functional test apparatus 17. The sets of tool stages 12-1 to 12-4, which include a deposit metal stage 12-1, a deposit dielectric stage 12-2, a patterning stage 12-3 and an RIE stage 12-4. Each of those stages 12-1 to 12-4 may include two or more similar tools which can process a given workpiece W. The two or more similar tools at a single stage are provided so that when one or more tools at a stage is/are otherwise occupied with processing or in need of repair another available tool at that stage can process the workpiece W without delay. The workpieces W enter the deposit metal stage 12-1 on conveyor line 11A. After processing at deposit metal stage 12-1, workpiece W moves on conveyor line 11B to dielectric deposition stage 12-2. After processing at stage 12-2, workpiece W moves on conveyor line 11C to patterning stage 12-3. After processing at stage 12-3, workpiece W moves on conveyor line 17A to RIE stage 12-4 where three RIE tools A, B and C are shown to illustrate the fact that there can be several tools at a single stage. The RIE stage 12-4 includes RIE A tool RA, RIE B tool RB, and RIE C tool RC.

The identification of workpieces W processed by individual tools is supplied on lines 13-1 to 13-4 to the DCP 15. In particular, each of the tools in stage 12-1 is connected to send workpiece identification data on line 13-1 to the DCP 15. Each of the tools in stage 12-2 is connected to send workpiece identification data on line 13-2 to the DCP 15. Each of the tools in stage 12-3 is connected to send workpiece identification data on line 13-3 to the DCP 15. In stage 12-4 RIE A Tool RA is connected by line 13-4A to send workpiece identification data to line 13-4; RIE B Tool RB is connected to send workpiece identification data by line 13-4B to line 13-4; and RIE C Tool RC is connected by line 13-4C to line 13-4. Lines 13-4A to 13-4C are connected to line 13-4 to send the workpiece identification data workpiece identification data for the tools RA-RC to the DCP 15. There may also be some test data collected which is supplied to the DCP 15, but there is no overall test data supplied on lines 13-1 to 13-4 as to the effects of processing by each individual tool upon the overall quality of the workpiece W. There are other tests made by parametric testers at various stages in the process of manufacture that provide parametric yield data, as distinguished from functional yield test data provided by the functional test apparatus 17 at the end of processing.

After completion of the first cycle of processing by the four stages 12-1 to 12-4, the workpiece W is recycled along line 14A to the input line 11 to stage 12-1 and is processed there by whichever tool is available in stage 12-1. Then the process is repeated at stages 12-2 to 12-4 as described above. The workpiece W is recycled N times through stages 12-1 to 12-4 repeatedly for manufacture of the metal layers until all of the metal layers including the metal layer N+1 have been manufactured in accordance with FIG. 1A. Then the workpiece W leaves the factory floor 12 on conveyor line 14Z which delivers it for testing to the functional test apparatus 17 which performs tests after all processing has been completed, as will be well understood by those skilled in the art. The data collected by the functional test apparatus is sent to the DCP 15.

FIG. 1C is a schematic diagram which comprises a chronological representation of several series of cycles of repetition of consecutive metallization processing by the stages 12-1 to 12-4 on the factory floor 12 by providing a duplicate block for each cycle of repetition of N repetitive uses of a stage in the manufacture of workpieces W which are being manufactured and tested.

The stage 12-1 includes a set of duplicate blocks for processing including deposit metal cycle 1 block 12-1A, a deposit metal cycle 2 block 12-1B therebelow; as well as deposit metal cycle N-2 block 12-1x; deposit metal cycle N-1 block 12-1Y and deposit metal cycle N block 12-1Z therebelow.

The stage 12-2 includes another set of duplicate blocks including a deposit dielectric cycle 1 block 12-2A, a deposit dielectric cycle 2 block 12-2B therebelow; a deposit dielectric cycle 2 block 12-2B, as well as deposit dielectric cycle N-2 block 12-2X; deposit dielectric cycle N-1 block 12-2Y and deposit dielectric cycle N block 12-2Z therebelow.

The stage 12-3 includes still another set of duplicate blocks including a pattern cycle 1 block 12-3A, a pattern cycle 2 block 12-3B therebelow; a pattern cycle 2 block 12-3B, as well as pattern cycle N-2 block 12-3X; pattern cycle N-1 block 12-3Y and pattern cycle N block 12-2Z therebelow.

The stage 12-4 includes yet another set of duplicate blocks including an RIE cycle 1 block 12-2A, an RIE cycle 2 block 12-2B therebelow; an RIE cycle 3 block 12-2B, as well as an RIE cycle N-2 block 12-2X; an RIE cycle N-1 block 12-2Y and an RIE cycle N block 12-2Z therebelow.

At the end of the first cycle of processing in RIE stage 12-4 in FIG. 1C, the workpiece W is transported on conveyer line 14A for recycling to stage 12-1 as indicated by block 12-1B which represents the fact that the workpiece W is now in the process of being subjected to BEOL metal layer 2 processing and that it will be processed consecutively by tools in the four stages 12-1 to 12-4, but that at each stage it will very likely be processed by a different tool at each of those stages 12-1 to 12-4 from the tool employed in the first cycle because some of the tools will be busy with other workpieces, or otherwise unavailable at the time the workpiece W arrives on line 14A. In the second cycle the workpiece is processed consecutively at deposit metal stage 12-1B; deposit dielectric stage 12-2B; pattern cycle 12-3B and one of the tools RA-RB in RIE stage 12-4B.

At the end of the second cycle of processing in RIE stage 12-4 in FIG. 1C, the workpiece W is recycled back on conveyer line 14B to stage 12-1 for BEOL metal layer 3 processing (not shown for convenience of illustration) and that it will be processed by tools in the four stages 12-1 to 12-4, but that it may be processed by different tools at each of those stages 12-1 to 12-4 from those of the first and second cycles because some of the tools will be busy with other workpieces, or otherwise unavailable at the time the workpiece W arrives on line 14B. Then the workpiece W is processed consecutively at deposit metal stage 12-1; deposit dielectric stage 12-2; pattern cycle 12-3 and one of the tools RA-RB in RIE stage 12-4 and the dots below line 14B indicate that numerous cycles of processing are omitted for convenience of illustration.

At the end of a subsequent N-3 cycle of processing (not shown in FIG. 1C), in RIE stage 12-4 the workpiece W is recycled back on conveyer line 14W to stage 12-1 for BEOL metal layer N-2 processing as indicated by block 12-1X which represents the fact that the workpiece W is now in the process of being subjected to BEOL metal layer N-2 processing and that it will be processed consecutively by tools in the four stages 12-1 to 12-4, but that it will probably be processed by different tools at each of those stages 12-1 to 12-4 from those of the some of the previous cycles because some of the tools will be busy with other workpieces, or otherwise unavailable at the time the workpiece W arrives on line 14W. Then the workpiece W is processed consecutively at deposit metal stage 12-1X; deposit dielectric stage 12-2X; pattern cycle 12-3X and one of the tools RA-RB in RIE stage 12-4X.

At the end of the N-2 cycle of processing in FIG. 1C in RIE stage 12-4, the workpiece W is recycled back on production line 14X to stage 12-1 for BEOL metal layer N-1 processing as indicated by block 12-1Y which represents the fact that the workpiece W is now in the process of being subjected to BEOL metal layer N-1 processing and that it will be processed by tools in the four stages 12-1 to 12-4, but that it will probably be processed by different tools at each of those stages 12-1 to 12-4 from those of many of the previous cycles because some of the tools will be busy with other workpieces, or otherwise unavailable at the time the workpiece W arrives on line 14X. In the N-1 cycle the workpiece W is consecutively processed at deposit metal stage 12-1Y; deposit dielectric stage 12-2Y; pattern cycle 12-3Y and one of the tools RA-RB in RIE stage 12-4Y.

At the end of the N-1 cycle of processing in FIG. 1C in RIE stage 12-4, the workpiece W is recycled back on production line 14Y to stage 12-1 for BEOL metal layer N processing as indicated by block 12-1Z which represents the fact that the workpiece W is now in the process of being subjected to BEOL metal layer N processing and that it will be processed by tools in the four stages 12-1 to 12-4, but that it will probably be processed by different tools at each of those stages 12-1 to 12-4 from those of many of the previous cycles because some of the tools will be busy with other workpieces, or otherwise unavailable at the time the workpiece W arrives on line 14Y. In the N cycle the workpiece is consecutively processed at deposit metal stage 12-1Z; deposit dielectric stage 12-2Z; pattern cycle 12-3Z and one of the tools RA-RB in RIE stage 12-4Z.

At the end of the N cycle of processing in FIG. 1C in RIE stage 12-4, the workpiece W is exits the factory floor back on conveyor line 14Z which delivers it to the Functional Test Apparatus 17 for functional testing as described above.

Referring to FIG. 2 a chart is shown of a prior art type analysis of the yield of a process step after the repetition of a process on a set on two tools, tool A and tool B at one stage, where one of the two tools A and B is actually performing better than the other. With current methods, by examination of a single process step as shown in FIG. 2 one might conclude that the performance of tool B is worse than that of tool A since the data shown on the chart in FIG. 2 would indicate that to be the case. However the problem with that approach is that the result may be attributable to the fact that semiconductor wafers with lower yields may have been processed on tool A at all of the other process steps, except the step analyzed, and yet tool B would be assumed to be the worse tool, even though that may not have been factually correct.

Current methods of detecting under-performance are limited in that as follows:

i.) they do not account for effects arising from repeated usage of a set of tools in subsequent process steps, as they all relate to a single processing step without accounting for past history;

ii.) by looking at only one process step, the analysis does not account for effects caused at prior or subsequent use of a common tool set and could lead to incorrect judgments regarding tool performance;

iii.) small and marginal effects are not detectable;

iv.) the under-performance of tools which perform variably over time, with periods of acceptable performance interspersed with finite periods of under-performance, are not detectable.

SUMMARY OF THE INVENTION

In accordance with this invention, data mining and analysis methods are employed for the purpose of detecting the presence of bad tool or a tool that is under-performing. The term "data mining" as employed herein refers to the employment of a computer system to perform an automatic search through large volumes of data to find various patterns of defects or absence thereof. Historically examples of data mining have included computational techniques performed by computers including statistical analysis, machine learning, and pattern recognition. In the context of the present invention, data mining and analysis methods are employed to detect the presence of bad tool or a tool that is under-performing or to identify the best performing tools in a complex manufacturing environment.

SQL, which is an ANSI/ISO standard, is a computer language used to create, modify and retrieve data from relational database management systems. The language has evolved beyond its original purpose to support object-relational database management systems.

The method of this invention is suited for manufacturing where output can be described by yield and it is applicable during a product manufacturing cycle when a similar process is repeated several times and a common set of tools is employed. Alternative, the method of this invention can detect the tools performing best. The method is applicable for analysis of multi-chamber tools as well. The method of this invention can be employed to study the yield influence of a common set of tools in chip manufacturing, and to detect which tools perform the worst.

The method of this invention employs an approach to analysis which accounts for the complete history of a set of tools shared in a sequence of many steps in a manufacturing process. The method of this invention employs analysis of yield parameters by accumulating and accounting for all processes that share the same tool set.

To identify a bad tool, a computer system analyzes the yield using the combinations of tools or chambers of multi-chamber tools applied to the manufacture of a large population of wafers, and also the number of times wafers were processed by the same tool or by the same tool chamber.

In one aspect of the method of this invention, each tool combination is counted, without accounting for the order in which each tool was used, and without accounting for the number of times a tool was used and re-used. If a bad tool has been employed in the process, all of the combinations of step in which that tool was included will tend to have a lower yield.

FIG. 3A is a chart showing, the trend of the mean yield data and other statistical parameters for each of several tool combinations. In FIG. 3A for each tool combination the trend of the mean yield data and other statistical parameters are revealed. If a bad tool exists, the combinations containing that tool stand out when the data are compared. In other words, in the case of a bad tool, the data show depressed yield when compared with other tool combinations. Referring again to the chart in FIG. 3A, a table is formed below the chart with each column pertaining to one of nine combinations of four tools A, B, C, and D taken, one, two, three, or four tools at a time. Note that all of the combinations which include tool C have lower mean yield data points as indicated by the lowest mean yield data points with rectangles around the circular marks around the round dots above each combination which includes tool C. Thus it is reasonable to conclude that tool C is bad.

In a second method illustrated by the chart in FIG. 3B, the results are shown for an analysis of the yield for each tool which is analyzed separately by counting the number of times the tool was used during the process of manufacture of a given product. Then statistical data as to mean yield is generated for each number of usages. The Number of Observations (NOBS) vary from 0 to 1,000, in this example, as indicated on the vertical set of values to the right side of the chart and the HOL (Health Of Line) parameters are shown on a scale from "0" to "1", with "1" representing the best possible performance (no defects) and "0" meaning all sites are bad (or in chip fabrication terms: all chips on a wafer are outside of the allowed range of values), on the left side of the chart. If a tool detracts from yield, the more times the tool is used on a given workpiece, the lower the yield.

Referring to FIG. 4, a variance of this method is to analyze all tools in a side by side comparison. In FIG. 4 the performance of a set of four tools A, B, C, and D is shown on the same graph for workpieces which have been processed once, twice or three times by the same tools A-D. Tools A and C do not appear to detract from the Mean Yield, while tool D underperforms marginally and tool B underperforms seriously, which is particularly noticeable after summarizing the yield of the all workpieces processed third times by tool B. Manifestly the analysis reveals the fact that action will be required to deal with the under-performance of tool B.

Referring to FIG. 5, the method can be also applied with multi-stage and multi-chamber tools (i.e. tools with more than one chamber of the kind shown in the schematic diagram in FIG. 6. FIG. 6 shows a tool 90 with multiple stages and multiple tools in each stage. In the first stage of tool 90 there are three chambers A, B, and C. In the second stage of tool 90 there are two chambers 1 and 2. Here in a given tool 90 the product passes through two process stages. In the first stage the product can be processed on any of the "triplet" chambers identified as A, B, C and in the second stage can it can be processed on any of the "twin" chambers identified as 1 and 2. A plot of all chamber-combinations for the tool can be made on one chart to identify any chamber-combination which is causing a significant delta in the yield data when the frequency of usage of the chamber-combinations in question is increased. In FIG. 5, a plot is shown of the six chamber-combinations seen in FIG. 6 which include chamber-combinations ChA-1, ChA-2, ChB-1, ChB-2, ChC-1, and ChC-2. From the plot it is seen that as the chamber-combination ChB-2 is used more times the yield is getting lower, and therefore action is required for this chamber-combination.

In accordance with the method of this invention the procedure, assumptions and method include select a group of operations that share a set of tools (RIE, Plating, Chemical Polish, Metal Deposition, etc. . . . ); acquiring the logistic data (down to chamber level) and merging with the Health of Line (HOL) data (e.g. charging HOL) or Yield data.

If a chamber has a negative effect on HOL/Yield the more the chamber is used the lower the yield.

In frequency analysis, using trend HOL_mean vs frequency for all tool-chambers, the fact that a chamber or tool is bad is revealed by a monotonic decrease in yield as a function of frequency of use thereof on a single workpiece. Alternatively, determine trend HOL percentiles vs frequency for each tool-chamber and display the curve of Number Of Observations (NOBS) relative to a second Y axis on the same chart.

In accordance with this invention, a method is provided for determining the quality of performance of a tool wherein a tool includes an individual tool unit or a tool unit comprising a chamber in a multichamber tool in a manufacturing system. The method comprises the following steps. Store process data from tools for each one of a plurality of individual processes for a processed object in a process database. Store tool performance data for each individual process for a processed object in a yield database. Develop statistics for similar tools associating data with each of the similar tool units. Generate yield numbers for each group of the similar tool units based upon the statistics. Identify well performing tool units and poorly performing tool units by using the yield numbers.

Preferably generate statistical numbers and associated yield numbers for each set of shared tools, for all tool combinations possible, without accounting for tool sequence. Preferably, identify a poorly performing tool when all combinations with that tool have a depressed yield, and identify a well performing tool when all combinations with that tool have an acceptable yield. Preferably, generate statistical numbers and associated yield numbers for each tool/chamber frequency. Preferably calculate a yield number for each frequency. Preferably identify a tool/chamber as performing at an unacceptable level when yield decreases monotonically with tool usage. Preferably collect object data from manufactured objects in a functional test apparatus, passing the object data to an object testing database, to a data collection processor, the data collection processor, and a data mining processor; supplying data from tools to the data collection processor; supplying data from the data collection processor to a logistic data base processor; supplying data from the logistic database to the data mining processor; and employing data mining processing to determine performance of the tool/chamber. Preferably employ SQL to summarize data for each object by tool and lot. Preferably create a frequency table of data by lot, object, and tool. Preferably create an object yield database. Preferably form a composite table by joining the frequency table and the object yield database. Preferably take frequency as an independent variable and yield as a dependent variable. Preferably determine whether tool frequency and tool yield correlate.

In accordance with another aspect of this invention, a system is provided for identifying performance of tool units in a manufacturing system performance relative to an acceptable level including a process database for storing process data from tools for each one of a plurality of individual processes for a processed object; a yield database for storing tool unit performance data for each individual process for a processed object; a data mining processor for developing statistics for similar tool units associating data with each of the similar tool units, a yield analyzer for generating yield numbers for each group of the similar tool units based upon the statistics, and a performance analyzer which identifies performance levels of tool units by using the yield numbers.

In accordance with still another aspect of this invention a system is provided for identifying the performance level of at least one chamber and/or at least one stage in a manufacturing system with respect to an acceptable level. The system includes a process database for storing process data from tools for each one of a plurality of individual processes for a processed object; a yield database for storing tool performance data for each individual process for a processed object; a data mining processor for developing statistics for similar tool units associating data with each of the similar tool units, a yield analyzer which generates yield numbers for each group of the similar tool units based upon the statistics, and a performance analyzer which identifies well and poorly performing tool units by using the yield numbers.

Preferably the data mining processor generates statistical numbers and associated yield numbers for each set of shared tools, for all tool combinations possible, without accounting for tool sequence. Preferably the data mining processor identifies a poorly performing tool when all combinations with that tool have a depressed yield. Preferably the data mining processor identifies a well performing tool when all combinations with that tool have an acceptable yield. Preferably the data mining processor generates statistical numbers and associated yield numbers for each tool/chamber frequency. Preferably the data mining processor calculates a yield number for each frequency and identifies a tool/chamber as performing at an unacceptable level when yield decreases monotonically with tool usage.

The invention and objects and features thereof will be more readily apparent from the following detailed description and appended claims when taken with the drawings.

BRIEF DESCRIPTION OF THE DRAWINGS

The foregoing and other aspects and advantages of this invention are explained and described below with reference to the accompanying drawings, in which:

FIG. 15 is a chart showing the performance of a multi-chamber tool on the same graph for workpieces which have been processed once, twice or three times by the same chamber of that multi-chamber tool.

DESCRIPTION OF THE PREFERRED EMBODIMENT

Figure 1A:
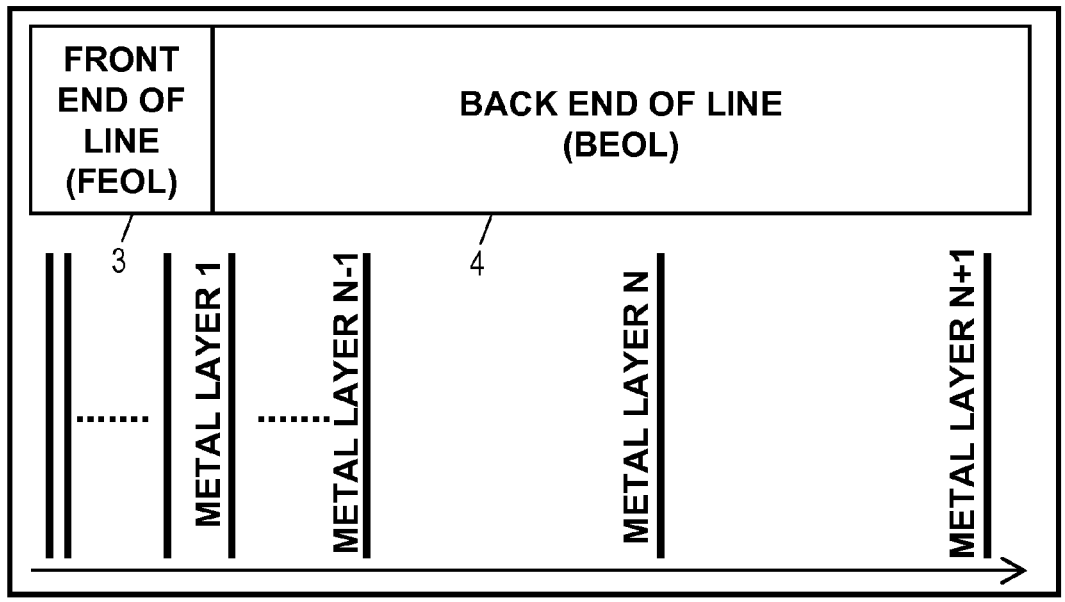
FIG. 1A shows a diagram illustrating a series of processing through a set of Front End of Line (FEOL) process steps into a set of Back End of Line (BEOL) process steps. Below the FEOL and BEOL blocks in FIG. 1A is a chart showing the metallization process cycles from a first metal layer cycle through to the last three metallization cycles.
Figure 1B:
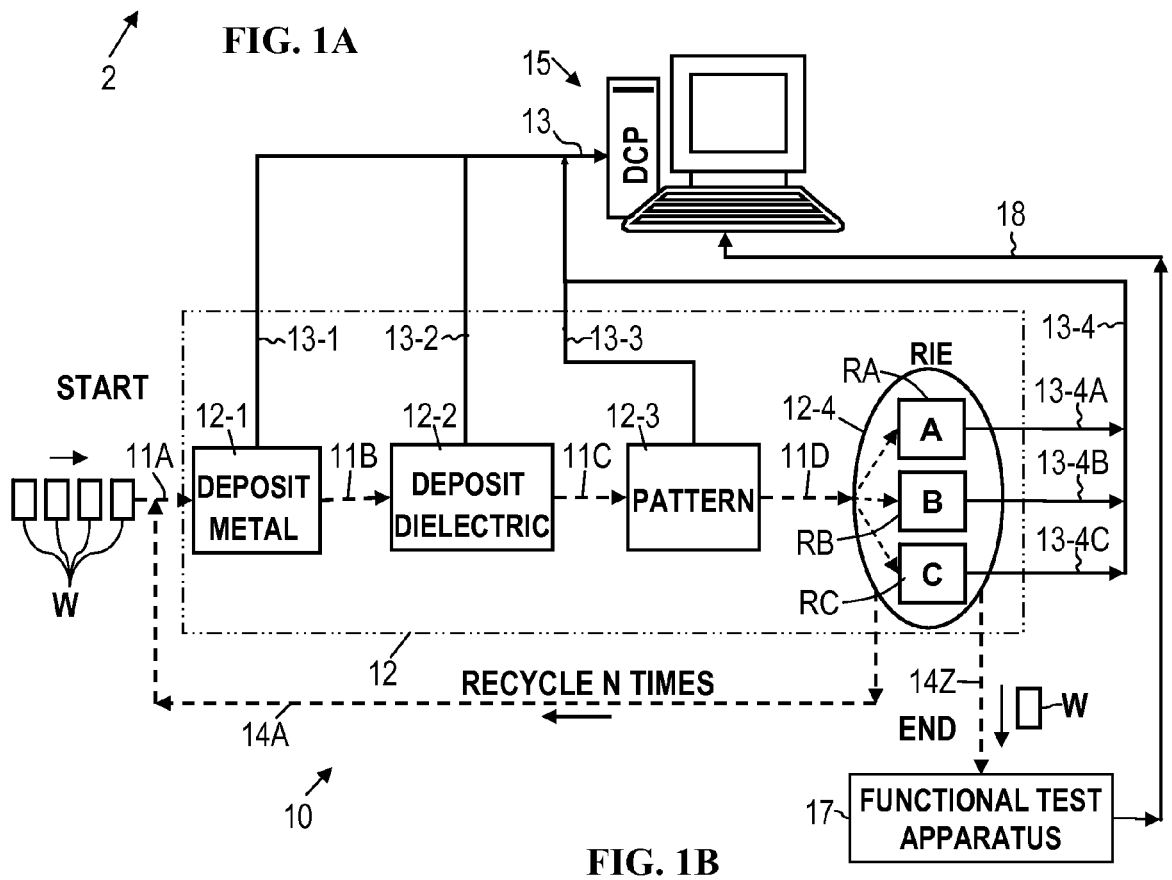
FIG. 1B is a schematic diagram which shows the multiple cycle metallization processing for workpieces which are being manufactured and tested by functional test apparatus with data being collected in a data collecting processor.
Figure 1C:
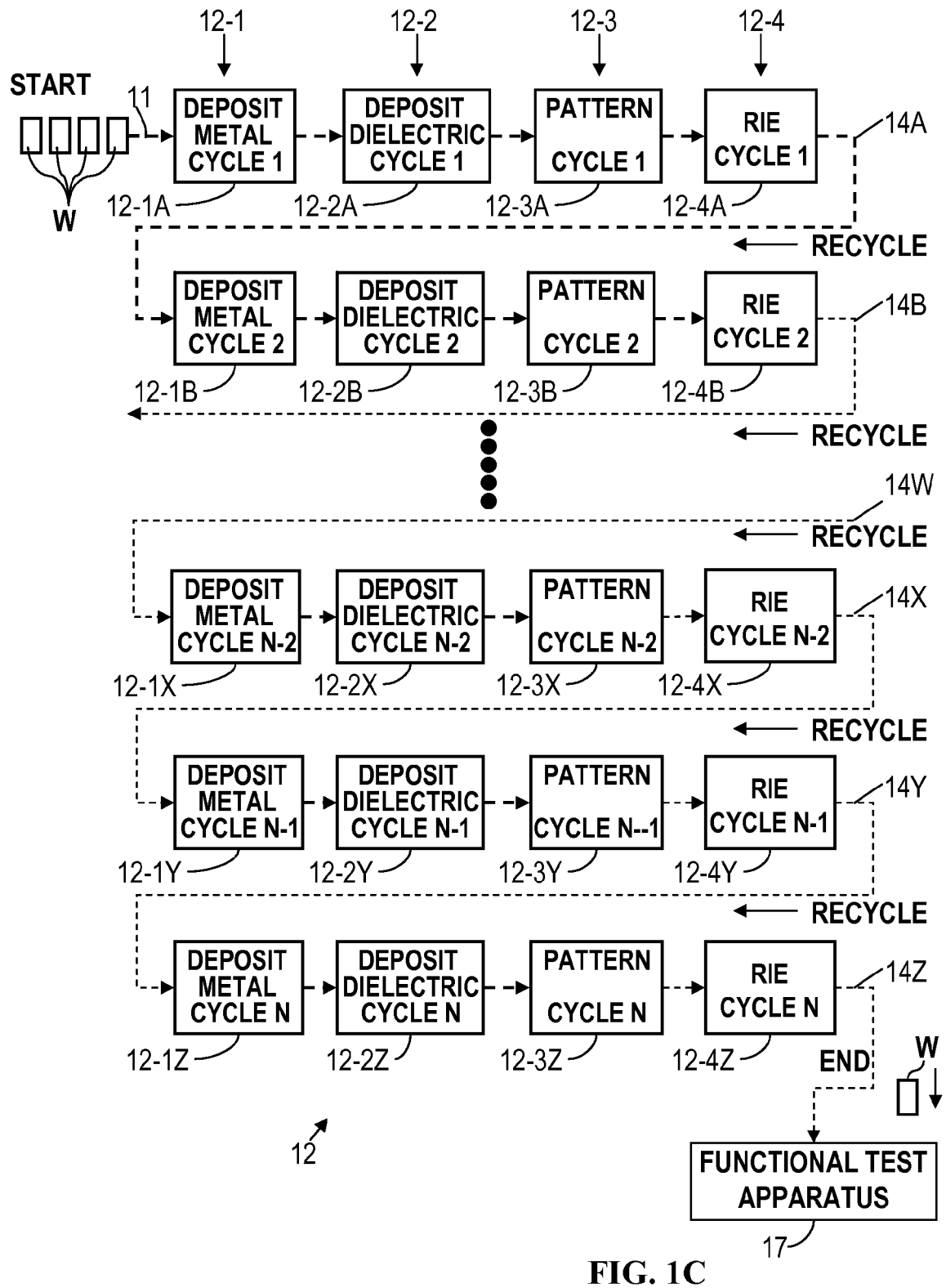
FIG. 1C is a schematic diagram which shows the duplication of use of the tools stages during the several cycles of the very large number of metallization process cycles for workpieces which are being manufactured and tested.
Figure 7A:
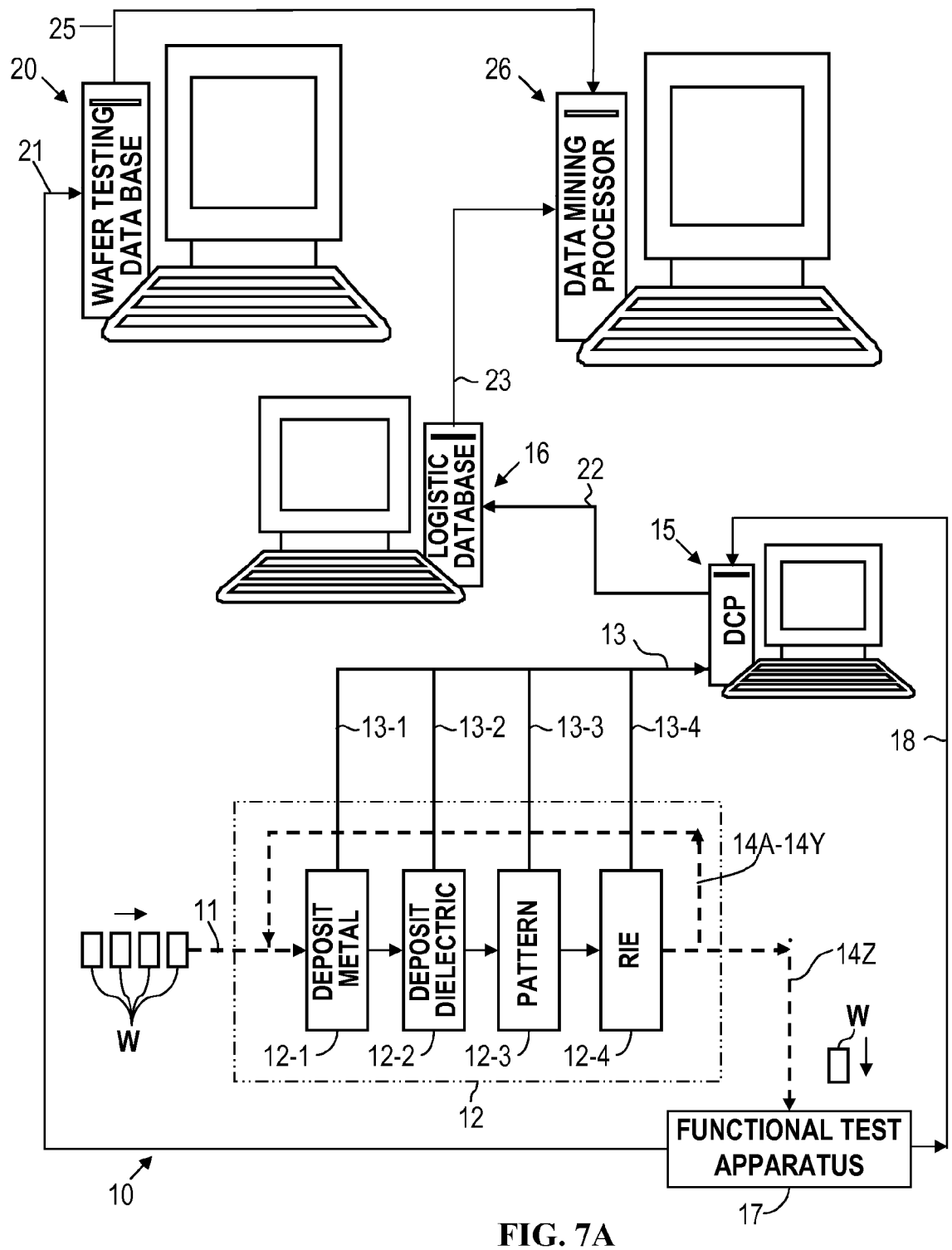
FIG. 7A is a schematic block diagram of a system with several computers for performing data mining of a manufacturing process connected via cables for receiving the data from the tools on a factory floor which houses several tools for manufacturing of objects and via other cables for receiving the data from functional test apparatus which tests the objects which were produced by the tools.

FIG. 7A is a schematic block diagram of a system 10 for performing data mining of a manufacturing process involving a factory floor 12 housing a plurality of tools for manufacturing of lots, each of which comprise several objects, i.e. workpieces W, in a production line. The system 10 performs data collection from a series of objects, i.e. workpieces W, being manufactured on the factory floor 12. The system 10 includes the factory floor which includes a set of tools located in a series of tool stages 12-1 to 12-4. The system 10 also includes a Data Collection Processor (DCP) 15 which collects object identification, lot identification, and tool identification data from each stage, a functional test apparatus 17, a logistic database 16, a wafer testing database 20, and a data mining processor 26. The factory floor 12 includes several tool stages comprising a deposit metal stage 12-1, a dielectric deposition stage 12-2, a patterning stage 12-3, and a RIE stage 12-4. As described above in connection with FIG. 1B, each stage includes a number of similar tools which can perform the same processing step or steps when they are available for use. The objects, i.e. workpieces W being processed, are being moved between tools on conveyors from stage to stage. The manufacturing process requires recycling of the work objects through the stages of tools in the process from cycle to cycle on a random basis depending upon which of the tools at a particular stage is available when a workpiece W arrives at the stage. During the repetitive cycles of repeated processing of the objects by various tools in the series of tool stages 12-1 to 12-4s, a large number of intermediate steps must be performed by many other tools (not shown for convenience of illustration).

The sets of tool stages 12-1 to 12-4, include a deposit metal stage 12-1, a deposit dielectric stage 12-2, a patterning stage 12-3 and an RIE stage 12-4. Each of those stages from 12-1 to 12-4 may include two or more similar tools which can process a given object, i.e. a workpiece W. The two or more similar tools at a single stage are provided so that when one or more tools at a stage is/are otherwise occupied with processing or in need of repair another available tool at that stage can process the workpiece W without delay. In other words an object in a production line is processed through the tool stations with tools in service being allocated to process an object on a first come first served basis at each station. The workpieces W enter the deposit metal stage 12-1 on conveyor line 11A. After processing at deposit metal stage 12-1, the object, i.e. workpiece W, moves on conveyor line 11B to dielectric deposition stage 12-2. After processing at stage 12-2, workpiece W moves on conveyor line 11C to patterning stage 12-3. After processing at stage 12-3, workpiece W moves on conveyor line 17A to RIE stage 12-4, which may include where three RIE tools A, B and C in a single stage as in FIG. 1B.

The identification of objects, i.e. workpieces W, processed by individual tools is supplied on lines 13-1 to 13-4 to the DCP 15. In particular, each of the tools in stage 12-1 is connected to send object, i.e workpiece, identification data on line 13-1 to the DCP 15. Each of the tools in stage 12-2 is connected to send workpiece identification data on line 13-2 to the DCP 15. Each of the tools in stage 12-3 is connected to send workpiece identification data on line 13-3 to the DCP 15. In stage 12-4 the RIE tools are connected to send workpiece identification data from line 13-4 to cable 13 to the DCP 15. There may also be some test data collected which is supplied to the DCP 15, but there is no overall test data supplied on lines 13-1 to 13-4 as to the effects of processing by each individual tool upon the overall quality of the workpiece W. There are other tests made by parametric testers at various stages in the process of manufacture such as yield data, as distinguished from functional test data provided by the functional test apparatus 17 at the end of processing.

After completion of the first cycle of processing by the series of four stages 12-1 to 12-4, the object, workpiece W, is recycled along line 14A-14Y to the input line 11 to stage 12-1 and is processed there by whichever tool is available in stage 12-1. The sequential process is repeated at stages 12-2 to 12-4 as described above. The object, workpiece W, is recycled many times through stages 12-1 to 12-4 repeatedly for manufacture of the metal layers until all of the metal layers including the metal layer N+1 have been manufactured in accordance with FIG. 1A. Then the object, workpiece W, leaves the factory floor 12 on conveyor line 14Z which delivers it for testing to the functional test apparatus 17 which performs tests after all processing has been completed, as will be well understood by those skilled in the art. The data collected by the functional test apparatus is sent to the DCP 15.

As each lot and each workpiece in the lot are processed by a tool, that tool will send data including the Wafer_id, i.e the object identification, the Lot_id, and the Tool_id, i.e the tool identification, via cable 13-1, 13-2, 13-3 or 13-4 from stage 12-1, 12-2, 12-3, or 12-4 respectively and via cable 13 to the Data Collection Processor (DCP) computer system 15. The Data Collection Processor (DCP) computer system 15 comprises a general purpose computer with a computer program which, among other things, stores the tool processing data for each lot and each object, i.e. workpiece W, therein. In summary, the data sent to the DCP computer system 15 on cables 13 comprises the identity of each lot (e.g. semiconductor wafer workpieces W) processed by each of the tools at each of the stages on the factory floor 12 and each workpiece W and the processing step(s) performed by the tools at each of the stages on the factory floor 12.

At the output from the factory floor 12, the objects, i.e workpieces W, are transported along conveyor line 14Z to the conventional functional test apparatus 17, where the workpieces W are tested for defects or parameters. The output data from the functional test apparatus 17 is supplied on cable 18 to the DCP computer system 15. The general purpose DCP computer system 15 stores the functional test data for each object, i.e. workpiece W, in each lot of workpieces. The functional test data for each object will include the Wafer_Id; and the Lot_id.

In accordance with current manufacturing technique, there may be several tools or chambers in a multi-chamber tool in stages 12-1 to 12-4 which provide data relating to processed lots and workpieces W.

There is a logistic database computer system 16 which contains the following data: Lot_id, Wafer_Id, Tool_Id, and Process Definition ID (PD_ID) which data are supplied thereto by cable 22 from the DCP computer system 15. The logistic database computer system 16 also contains the Process Definition ID (PD_ID) data which is entered into the DCP computer system. The DCP computer system gets data from tool log files. The logistic data base computer system 16 supplies the following data: LOT ID, WAFER ID; TOOL ID and the Process Definition ID (PD_ID) data on cable 23 to the Data Mining Processor 26.

Output comprising yield data from the functional test apparatus 17 is supplied via cable 21 to the Wafer Testing Data Base computer 20 which calculates the yield data for each workpiece and each lot. The yield data sent to the Wafer Testing Data Base computer 20 via cable 21 comprises results of the testing of objects, i.e. workpieces W, by the functional test apparatus 17. The Wafer Testing Database computer 20 supplies yield data on cable 25 to Data Mining Processor 26.

Figure 7B:
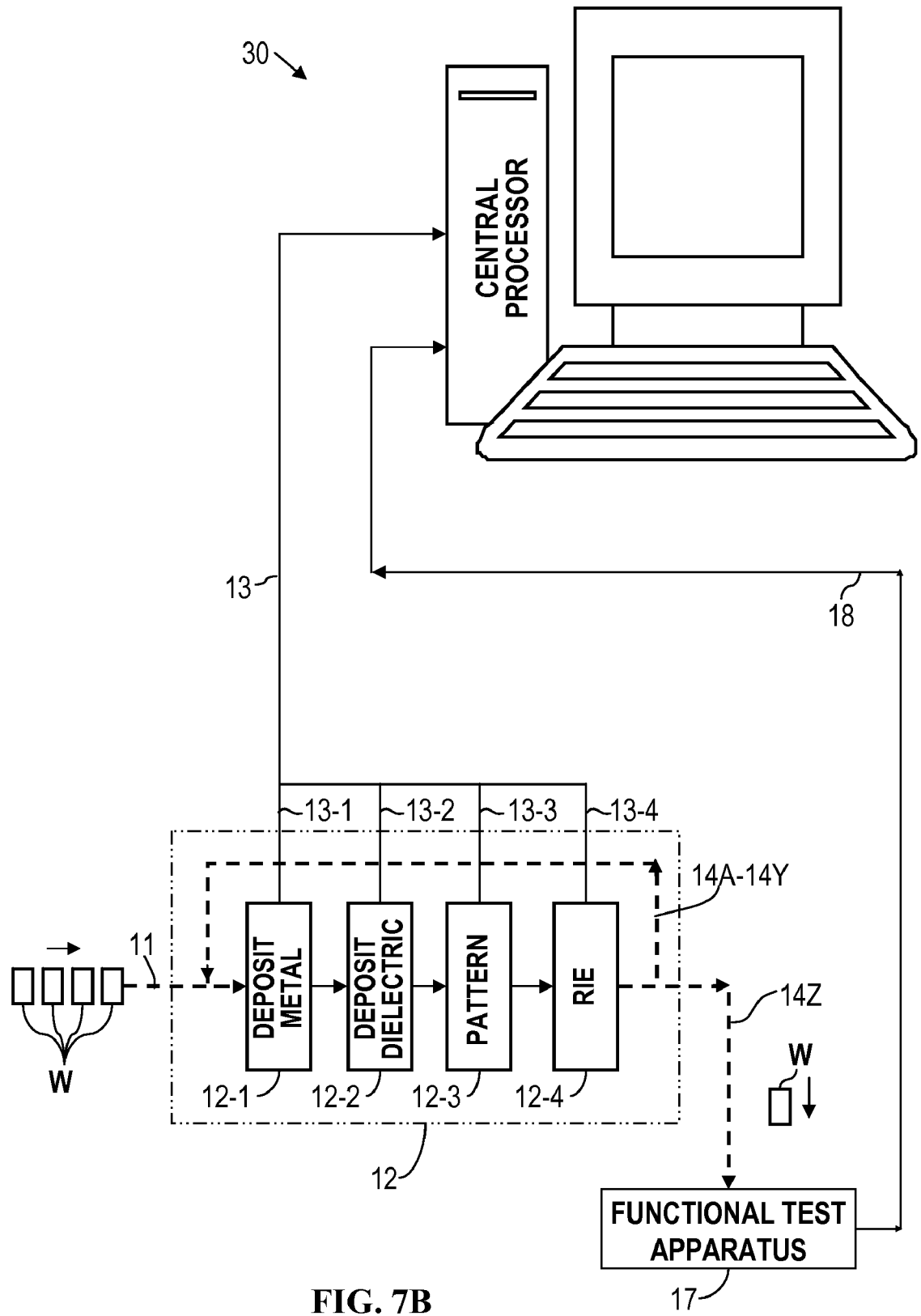
FIG. 7B shows a modification of the system of FIG. 7A in which a single central processor computer system is connected via cables for receiving the data from the tools on the factory floor and via other cables for receiving the data from the functional test apparatus for processing in like manner to the functions provided by the four computers systems shown in FIG. 7A.

FIG. 7B shows a modification of the system 10 of FIG. 7A in which a single central processor computer system 30 is connected via cables 13, 13-1, 13-2, 13-3 and 13-4 for receiving the data from the tools on the factory floor 12 and via cable 18 for receiving the data from the functional test apparatus 17 for processing in like manner to the functions provided by the four computers systems 15, 16, 20 and 26 in FIG. 7A.

Figure 8:
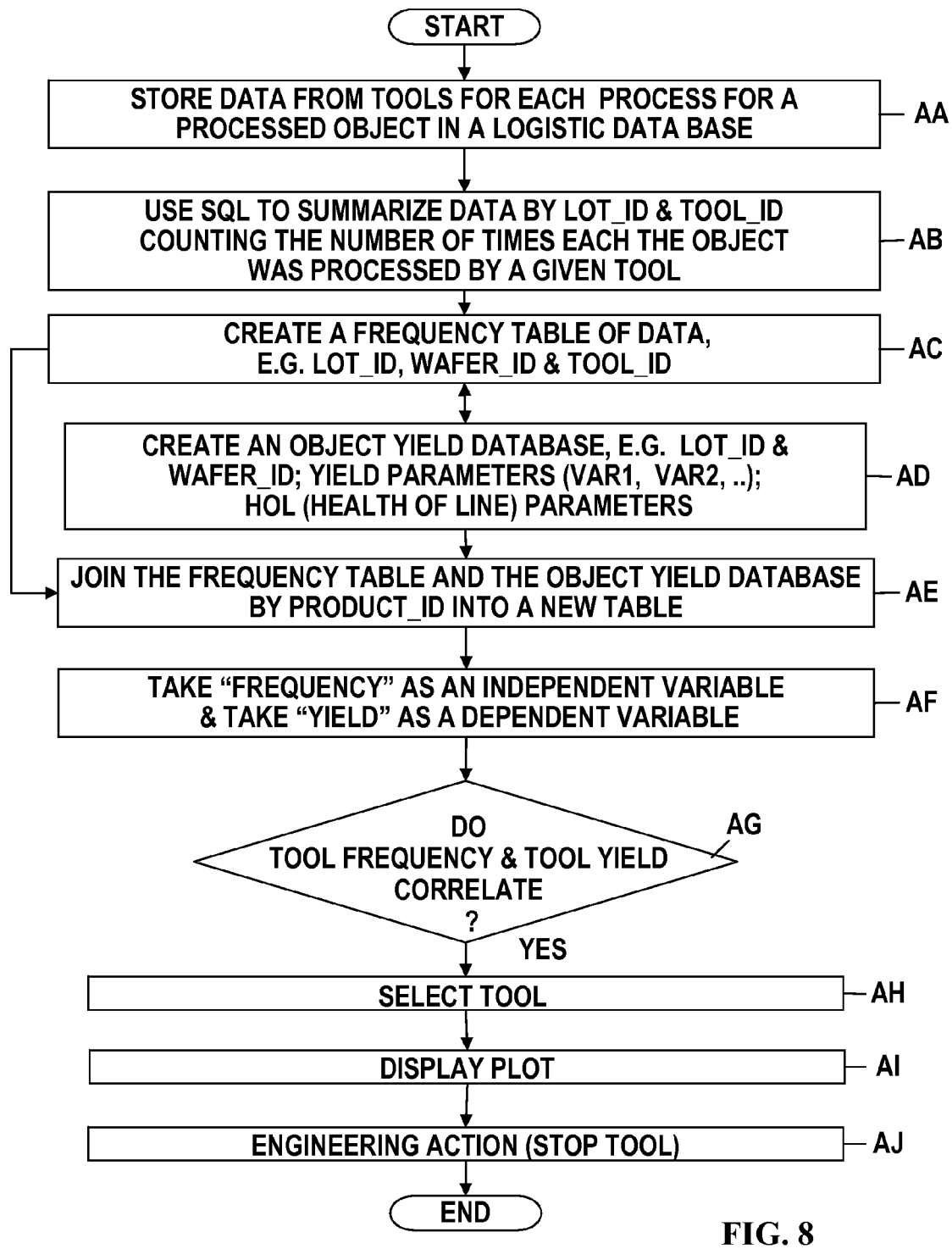
FIG. 8 is a flow chart of a method of processing data employing the apparatus of FIGS. 7A and 7B.

FIG. 8 is a flow chart of a method of processing data employing the apparatus shown in FIGS. 7A and 7B. Reference will be made principally to FIG. 7A for clarity of explanation. In step AA, data from the tools A, B, and C is transmitted via cables 13, 13-1, 13-2, and 13-3 and via the DCP computer system 15 and cable 22. As a result, data for a processed object such as a workpiece W is stored in the logistic database computer system 16 in FIG. 7A. Then in step AB in FIG. 2, the logistic database computer system 16 uses SQL to summarize data by Lot_id & Tool_id counting the number of times each object was processed by a given tool.

TABLE I

SQL DATA with Wafer_id, Lot_id, & Tool_id

| Lot_id | Wafer_id | Tool_id | Process_step |
|---|---|---|---|
| Lot_1 | Wafer_11 | Tool_A | PD_ID_1 |
| Lot_1 | Wafer_12 | Tool_A | PD_ID_1 |
| Lot_1 | Wafer_13 | Tool_A | PD_ID_1 |
| Lot_1 | Wafer_11 | Tool_A | PD_ID_2 |
| Lot_1 | Wafer_12 | Tool_A | PD_ID_2 |
| Lot_1 | Wafer_13 | Tool_A | PD_ID_2 |
| Lot_1 | Wafer_11 | Tool_A | PD_ID_3 |
| Lot_1 | Wafer_12 | Tool_A | PD_ID_3 |
| Lot_1 | Wafer_13 | Tool_A | PD_ID_3 |
| Lot_1 | Wafer_11 | Tool_B | PD_ID_4 |
| Lot_1 | Wafer_12 | Tool_B | PD_ID_4 |
| Lot_1 | Wafer_13 | Tool_B | PD_ID_4 |
| Lot_1 | Wafer_11 | Tool_B | PD_ID_5 |
| Lot_1 | Wafer_12 | Tool_B | PD_ID_5 |
| Lot_1 | Wafer_13 | Tool_B | PD_ID_5 |
| Lot_1 | Wafer_11 | Tool_C | PD_ID_6 |
| Lot_1 | Wafer_12 | Tool_C | PD_ID_6 |
| Lot_1 | Wafer_13 | Tool_C | PD_ID_6 |
| Lot_2 | Wafer_21 | Tool_A | PD_ID_1 |
| Lot_2 | Wafer_22 | Tool_A | PD_ID_1 |
| Lot_2 | Wafer_23 | Tool_A | PD_ID_1 |
| Lot_2 | Wafer_21 | Tool_A | PD_ID_2 |
| Lot_2 | Wafer_22 | Tool_A | PD_ID_2 |
| Lot_2 | Wafer_23 | Tool_A | PD_ID_2 |
| Lot_2 | Wafer_21 | Tool_B | PD_ID_4 |
| Lot_2 | Wafer_22 | Tool_B | PD_ID_4 |
| Lot_2 | Wafer_23 | Tool_B | PD_ID_4 |
| Lot_2 | Wafer_21 | Tool_B | PD_ID_5 |
| Lot_2 | Wafer_22 | Tool_B | PD_ID_5 |
| Lot_2 | Wafer_23 | Tool_B | PD_ID_5 |
| Lot_2 | Wafer_21 | Tool_B | PD_ID_6 |
| Lot_2 | Wafer_22 | Tool_B | PD_ID_6 |
| Lot_2 | Wafer_23 | Tool_B | PD_ID_6 |
| Lot_2 | Wafer_21 | Tool_B | PD_ID_7 |
| Lot_2 | Wafer_22 | Tool_B | PD_ID_7 |
| Lot_2 | Wafer_23 | Tool_B | PD_ID_7 |
| Lot_2 | Wafer_21 | Tool_C | PD_ID_8 |
| Lot_2 | Wafer_22 | Tool_C | PD_ID_8 |
| Lot_2 | Wafer_23 | Tool_C | PD_ID_8 |

In step AC create a frequency table of data, e.g. Lot_id, Wafer_id & Tool_id shown in Table II below.

TABLE II

Resulting Frequency of the SQL Data With Lot_id & Tool_id

| Lot_id | Wafer_id | Tool_id | Tool Frequency (Number of times lot processed by the Tool) |
|---|---|---|---|
| Lot_1 | Wafer_11 | Tool_A | 3 |
| Lot_1 | Wafer_12 | Tool_A | 3 |
| Lot_1 | Wafer_13 | Tool_A | 3 |
| Lot_1 | Wafer_11 | Tool_B | 2 |
| Lot_1 | Wafer_12 | Tool_B | 2 |
| Lot_1 | Wafer_13 | Tool_B | 2 |
| Lot_1 | Wafer_11 | Tool_C | 1 |
| Lot_1 | Wafer_12 | Tool_C | 1 |
| Lot_1 | Wafer_13 | Tool_C | 1 |
| Lot_2 | Wafer_21 | Tool_A | 2 |
| Lot_2 | Wafer_22 | Tool_A | 2 |
| Lot_2 | Wafer_23 | Tool_A | 2 |
| Lot_2 | Wafer_21 | Tool_B | 4 |
| Lot_2 | Wafer_22 | Tool_B | 4 |
| Lot_2 | Wafer_23 | Tool_B | 4 |
| Lot_2 | Wafer_21 | Tool_C | 1 |
| Lot_2 | Wafer_22 | Tool_C | 1 |
| Lot_2 | Wafer_23 | Tool_C | 1 |

In step AD create an object yield database, e.g. Lot_id, Wafer_id; yield parameters (VAR1, VAR2, . . . ); HOL (Health Of Line) parameters.

TABLE III

Object Yield Database

| Lot_id | Wafer_id | All Good Yield |
|---|---|---|
| Lot_1 | Wafer_11 | 30 |
| Lot_1 | Wafer_12 | 40 |
| Lot_1 | Wafer_13 | 45 |
| Lot_1 | Wafer_11 | 30 |
| Lot_1 | Wafer_12 | 40 |
| Lot_1 | Wafer_13 | 45 |
| Lot_1 | Wafer_11 | 30 |
| Lot_1 | Wafer_12 | 40 |
| Lot_1 | Wafer_13 | 45 |
| Lot_2 | Wafer_21 | 50 |
| Lot_2 | Wafer_22 | 55 |
| Lot_2 | Wafer_23 | 56 |
| Lot_2 | Wafer_21 | 50 |
| Lot_2 | Wafer_22 | 55 |
| Lot_2 | Wafer_23 | 56 |
| Lot_2 | Wafer_21 | 50 |
| Lot_2 | Wafer_22 | 55 |
| Lot_2 | Wafer_23 | 56 |

In step AE join the frequency table and the object yield database by PRODUCT_ID into a new table shown by Table IV.

TABLE IV

| Lot_id | Wafer_id | All Good Yield | Tool Frequency (Number of times lot processed by the Tool) | Tool_id |
|---|---|---|---|---|
| Lot_1 | Wafer_11 | 30 | 3 | Tool_A |
| Lot_1 | Wafer_12 | 40 | 3 | Tool_A |
| Lot_1 | Wafer_13 | 45 | 3 | Tool_A |
| Lot_1 | Wafer_11 | 30 | 2 | Tool_B |
| Lot_1 | Wafer_12 | 40 | 2 | Tool_B |
| Lot_1 | Wafer_13 | 45 | 2 | Tool_B |
| Lot_1 | Wafer_11 | 30 | 1 | Tool_C |
| Lot_1 | Wafer_12 | 40 | 1 | Tool_C |
| Lot_1 | Wafer_13 | 45 | 1 | Tool_C |
| Lot_2 | Wafer_21 | 50 | 2 | Tool_A |
| Lot_2 | Wafer_22 | 55 | 2 | Tool_A |
| Lot_2 | Wafer_23 | 56 | 2 | Tool_A |
| Lot_2 | Wafer_21 | 50 | 4 | Tool_B |
| Lot_2 | Wafer_22 | 55 | 4 | Tool_B |
| Lot_2 | Wafer_23 | 56 | 4 | Tool_B |
| Lot_2 | Wafer_21 | 50 | 1 | Tool_C |
| Lot_2 | Wafer_22 | 55 | 1 | Tool_C |
| Lot_2 | Wafer_23 | 56 | 1 | Tool_C |

In step AF take "Frequency" as an independent variable & take "yield" as a dependent variable In step AG a test is made which is to determine "Do tool Frequency and the tool Yield correlate?" IN step AG, a generalized linear model is used to evaluate the correlation between all good yield and Tool Frequency in accordance with the equation as follows:

$Y = a + b*x$. Where: $a$ = intercept; $b$ = slope of the line; $Y$ = all good Yield, and $X$ = tool Frequency for one tool.

We test whether b is significantly different from zero, then we check to see if b is positive or negative. If b is significantly different from zero, then there is a correlation between yield and tool frequency.

If b equals zero (horizontal line) there is no variation in yield as a function of frequency so tool does not affect yield.

In step AH select tool one selects a tool. If b is negative, this means the tool is a bad tool. If b is positive, this means the tool is a good tool.

Figure 13:
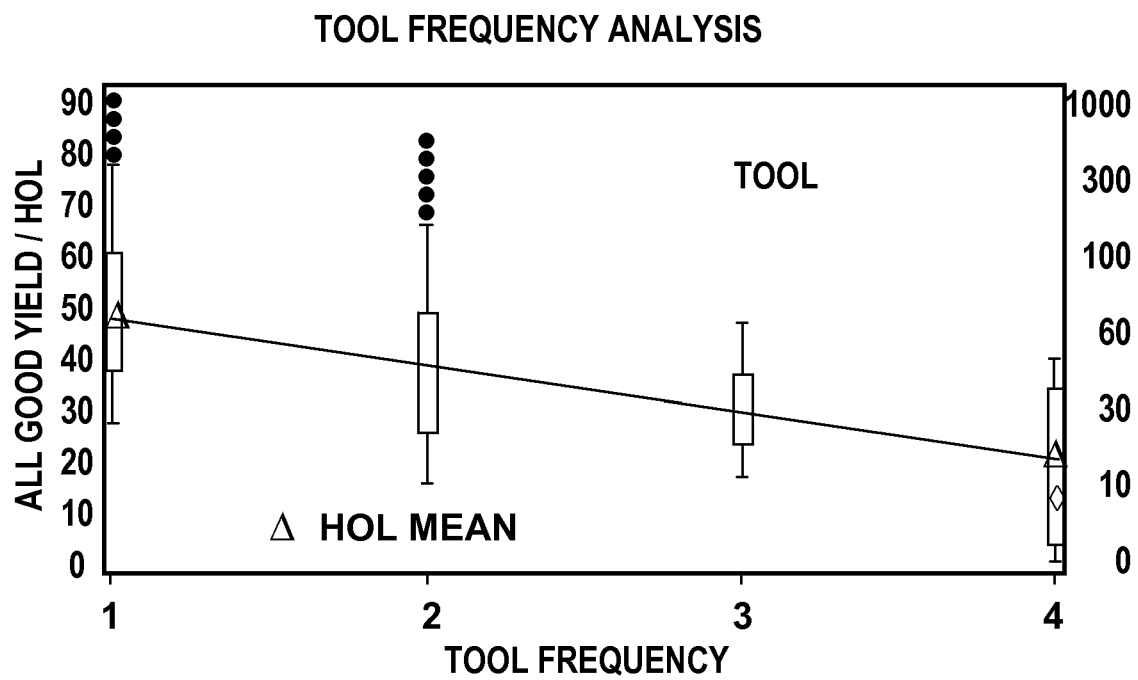
FIG. 13 is a chart showing the results of an analysis of the yield for a single tool considered separately by counting the number of times the tool was used during the process of manufacture of a given product.

In step AI display the tool frequency analysis plot shown in FIG. 13.

FIG. 13 is a chart showing the results of an analysis of the yield for a single tool considered separately by counting the number of times the tool was used during the process of manufacture of a given product.

In step AJ engineering action (stop tool.) If b is negative tool is bad, stop the tool.

Figure 9A:
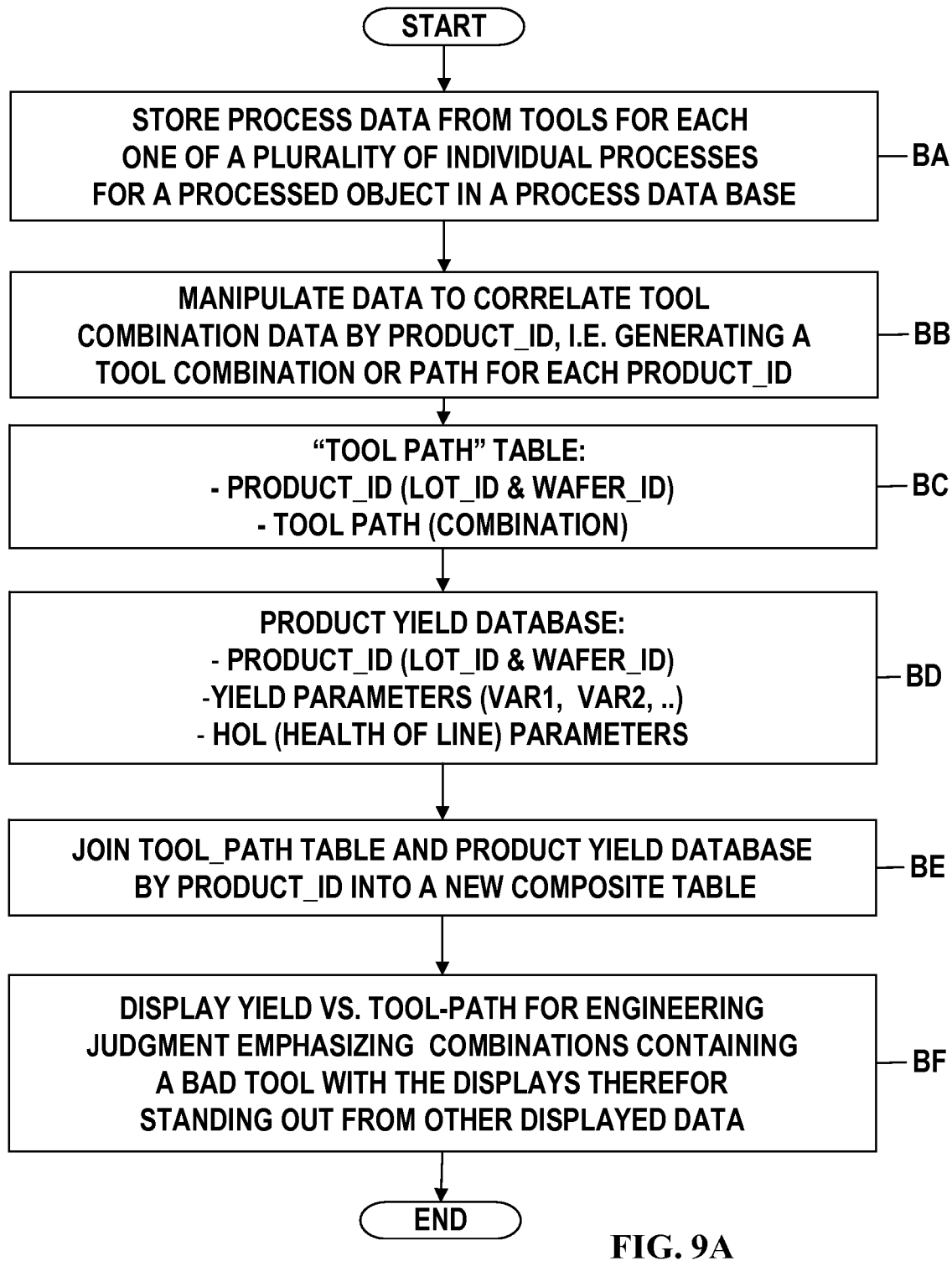
FIG. 9A is another flow chart showing a method of processing data employing the apparatus of both FIG. 7A and FIG. 7B.

FIG. 9A is a flow chart of a method of processing data employing the apparatus shown in FIGS. 7A and 7B; and reference will be made principally to FIG. 7A for clarity of explanation.

In step BA, data from the tools A, B, C is transmitted via cables 13, 13A, 13B, and 13C and via cable 18 to the DCP computer system 15. As a result, data for process data from tools for each one of a plurality of individual processes for a processed object is stored in a data base in the DCP 15 in FIG. 7A In step BB, the DCP 15 transmits the data from step BA to the logistic database processor 16 which manipulates the data collected in step BA to correlate tool combination data by PRODUCT_ID, i.e. generating a tool combination or path for each PRODUCT_ID.

In step BC logistic database processor 16 creates a "Tool Path" Table for the Lot_id & Wafer_id; and the Tool Path (Combination) of the object through the various tools on the factory floor 12. Table V below shows a table of combinations of tool paths for the factory floor 12 of FIG. 7A during eight runs of lots 1 and 2 through the three stages 1-3.

TABLE V

TOOL PATH COMBINATIONS

| RUN | Lot_id | Wafer_id | STAGE 1 | STAGE 2 | STAGE 3 | Tool_Combination |
|---|---|---|---|---|---|---|
| 1 | 1 | 1_1 | 1A | 2C | 3C | A_C |
| 1 | 1 | 1_2 | 1A | 2C | 3C | A_C |
| 1 | 1 | 1_3 | 1A | 2C | 3C | A_C |
| 2 | 2 | 2_1 | 1C | 2A | 3B | A_B_C |
| 2 | 2 | 2_2 | 1C | 2A | 3B | A_B_C |
| 2 | 2 | 2_3 | 1C | 2A | 3B | A_B_C |

In step BD a Product Yield Data Base is created comprising PRODUCT_ID (Lot_id & Wafer_id), Yield Parameters (VAR1, VAR2, . . . ), and HOL (Health Of Line) Parameters as shown in Table VI

TABLE VI

PRODUCT YIELD TABLE

| Lot_id | Wafer_id | All Good Yield | Chain Limited Yield | HOL |
|---|---|---|---|---|
| 1 | 1_1 | 50 | 62 | 99 |
| 1 | 1_2 | 51 | 62 | 98 |
| 1 | 1_3 | 52 | 63 | 98 |
| 2 | 1_1 | 41 | 59 | 90 |
| 2 | 1_2 | 42 | 59 | 91 |
| 2 | 1_3 | 43 | 60 | 93 |

In step BE Join the data from TOOL_PATH in Table V and Product Yield Database by PRODUCT_ID in Table VI into a new Composite Table seen in TABLE VII below.

TABLE VII

COMPOSITE TABLE

| RUN | Lot_id | Wafer_id | STAGE 1 | STAGE 2 | STAGE 3 | TOOL_Combination | All Good Yield | Chain Limited Yield | HOL |
|---|---|---|---|---|---|---|---|---|---|
| 1 | 1 | 1_1 | 1A | 2C | 3C | A_C | 50 | 62 | 99 |
| 1 | 1 | 1_2 | 1A | 2C | 3C | A_C | 51 | 62 | 98 |
| 1 | 1 | 1_3 | 1A | 2C | 3C | A_C | 52 | 63 | 98 |
| 2 | 2 | 2_1 | 1C | 2A | 3B | A_B_C | 41 | 59 | 90 |
| 2 | 2 | 2_2 | 1C | 2A | 3B | A_B_C | 42 | 59 | 91 |
| 2 | 2 | 2_3 | 1C | 2A | 3B | A_B_C | 43 | 60 | 93 |

Figure 3A:
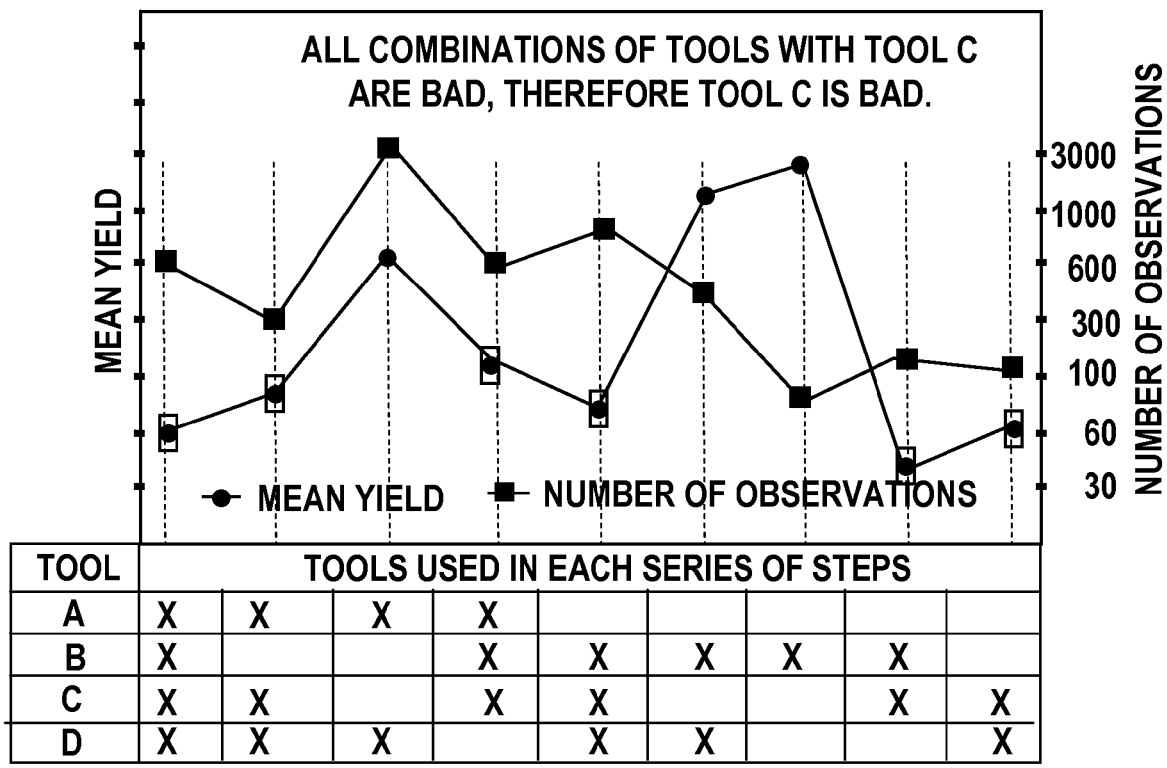
FIG. 3A is a chart showing, the trend of the mean yield data and other statistical parameters for each of several tool combinations

In step BF of FIG. 3A, display on the monitor of the data mining processor 26 the data in TABLE VII of the Yield vs. TOOL_PATH data for assisting engineering personnel in making judgments as to which tools are performing badly. The display emphasizes combinations containing a bad tool so the displays therefore stand out from the surrounding data being displayed.

Figure 9B:
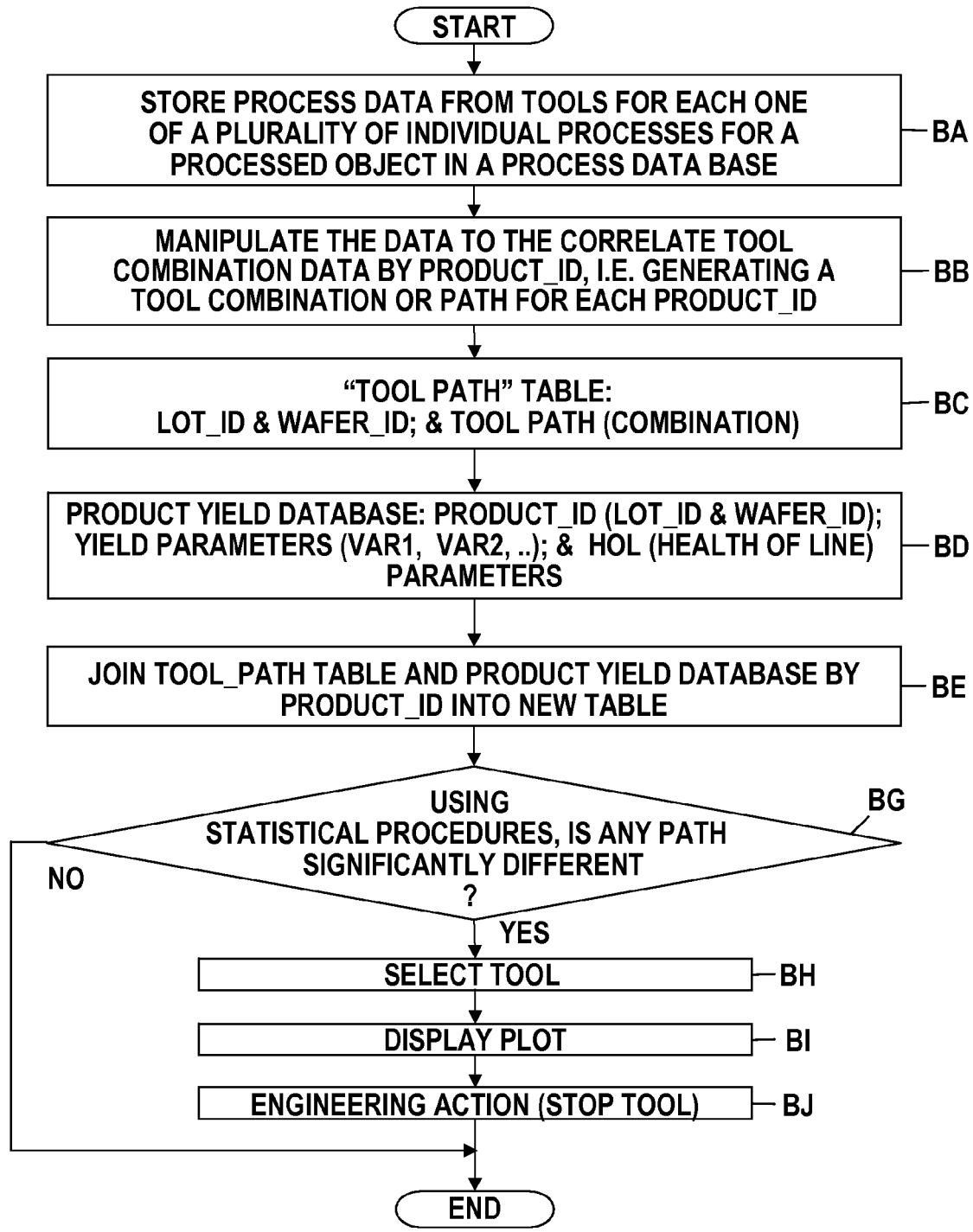
FIG. 9B is a flow chart which is a modification of FIG. 9A showing a method of processing data employing the apparatus of both FIG. 7A and FIG. 7B.

FIG. 9B is a flow chart of a method of processing data employing the apparatus shown in FIGS. 7A and 7B; which is a modification of FIG. 9A but which is the same form block BA to block BE. There is no block BF in FIG. 9B and block BG follows block BE. Block BG in FIG. 9B is a decision block which reads:

Using Statistical Procedures, is any Path Significantly Different?

The statistical model is called ANOVA (Analysis Of Variance) which can be used to identify group difference. If p-value<0.1, we have found that there is tool combination difference.

In step BH select tool one selects a tool. Referring to FIG. 9B in step BH, in a given tool the product has two process stages, in the first stage it can be processed on any of the "triplet" chambers identified as A, B, C and in the second stage can it can be processed on any of the "twin" chambers identified as 1 and 2.

In step BI the Yield versus Frequency data for a tool determined to be affecting yield is displayed on a computer monitor for engineering judgment. The analysis has determined that there is a dependence between Yield and the number of times the tools was used. Therefore the tool requires human intervention. The tool needs either calibration, maintenance work or repairs. Depending on the severity of the problem and the availability of other tool the engineer has to decide if and when to stop tool, in step BJ.

Figure 10:
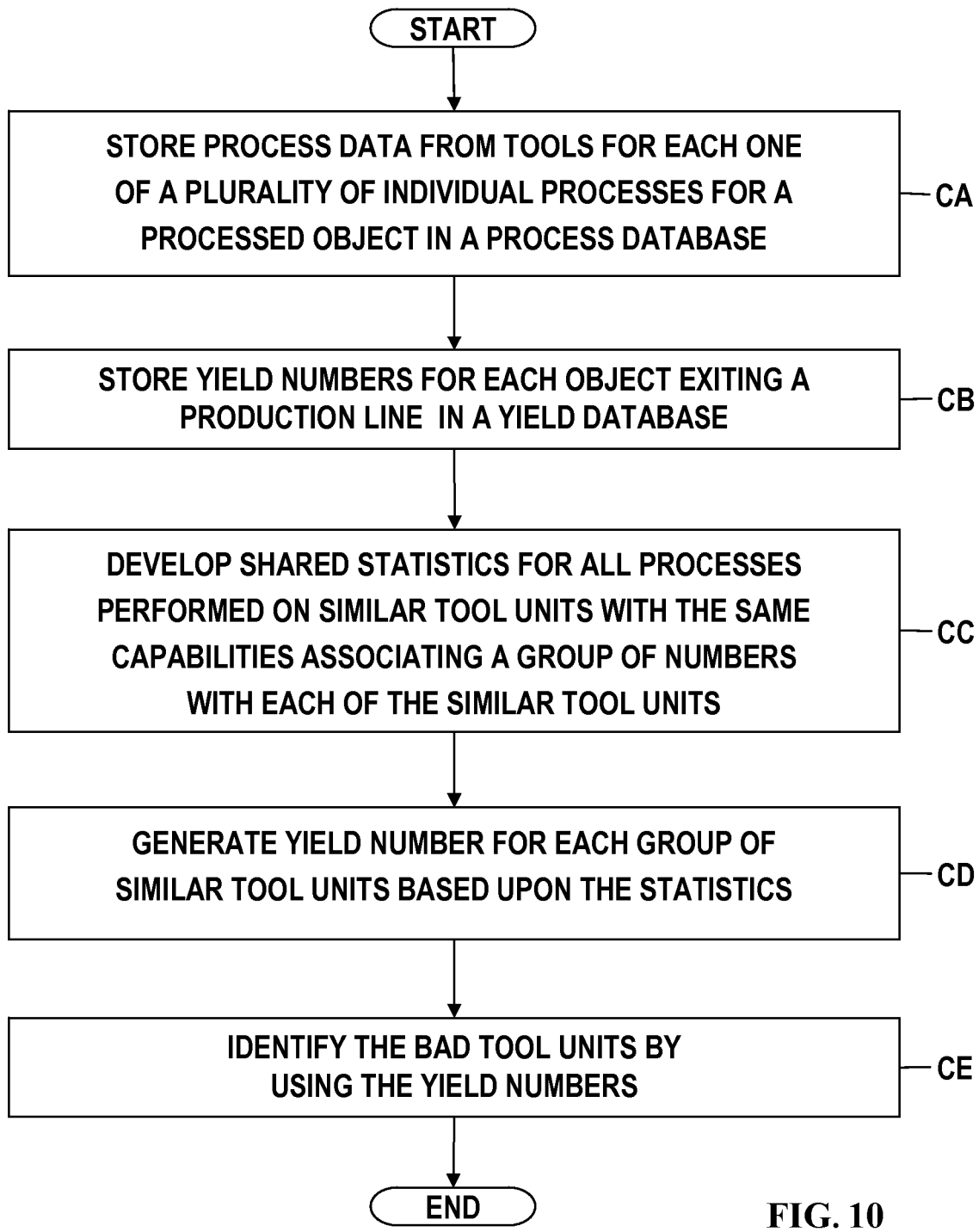
FIG. 10 is a flow chart is provided to account for the complete processing history of a set of tools shared in a manufacturing process.

In FIG. 10, a flow chart is provided to account for the complete processing history of the set of tools shared in a manufacturing process.

In step CA store process data from tools for each one of a plurality of individual processes for a processed object in a process database.

Processing data, meaning tool information for each individual process for the processed object, is stored in a database as indicated above.

Figure 2:
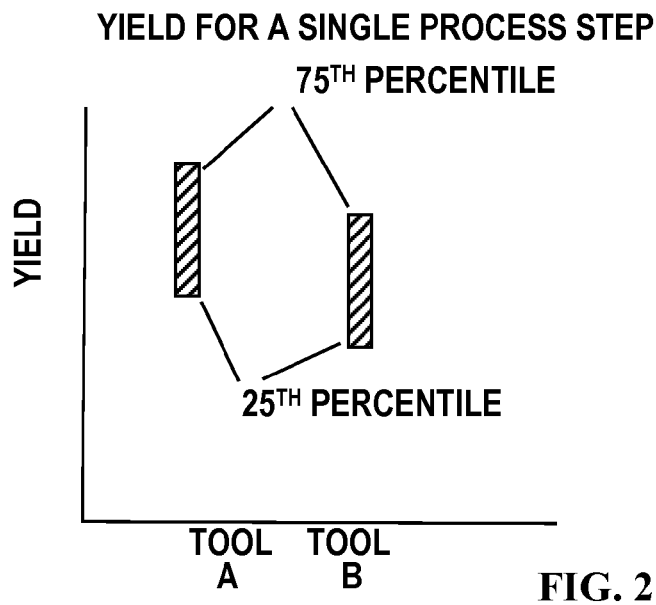
FIG. 2 is a chart showing a prior art type analysis of the yield of a process step the after repetition of a process on a set on two tools with one tool having superior performance.
Figure 3B:
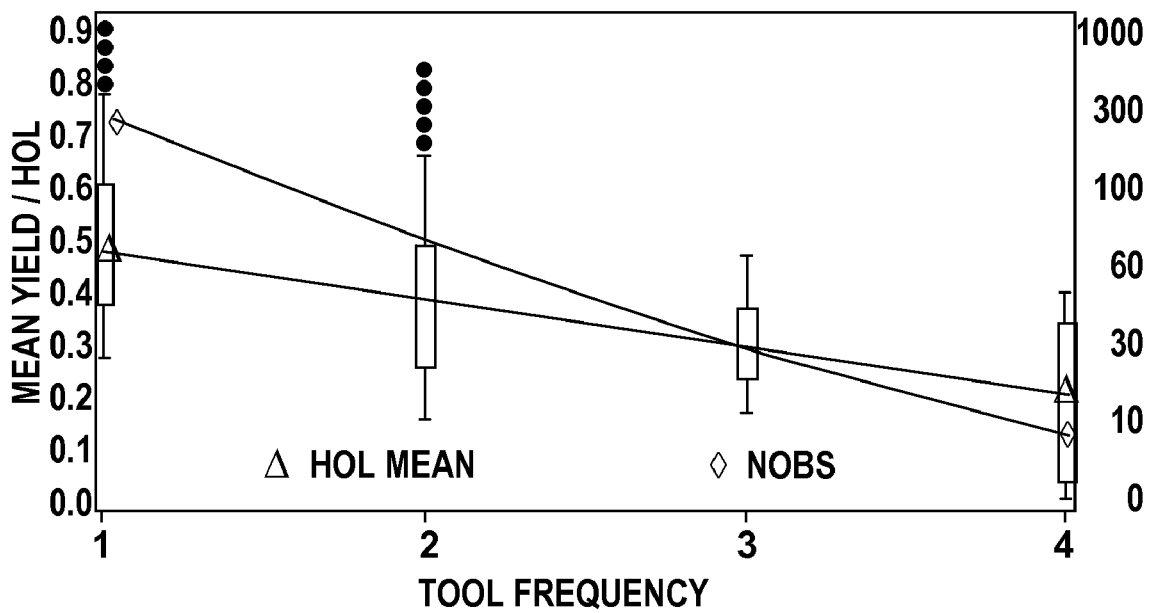
FIG. 3B is a chart showing the results of an analysis of the yield for each tool considered separately by counting the number of times the tool was used during the process of manufacture of a given product.
Figure 4:
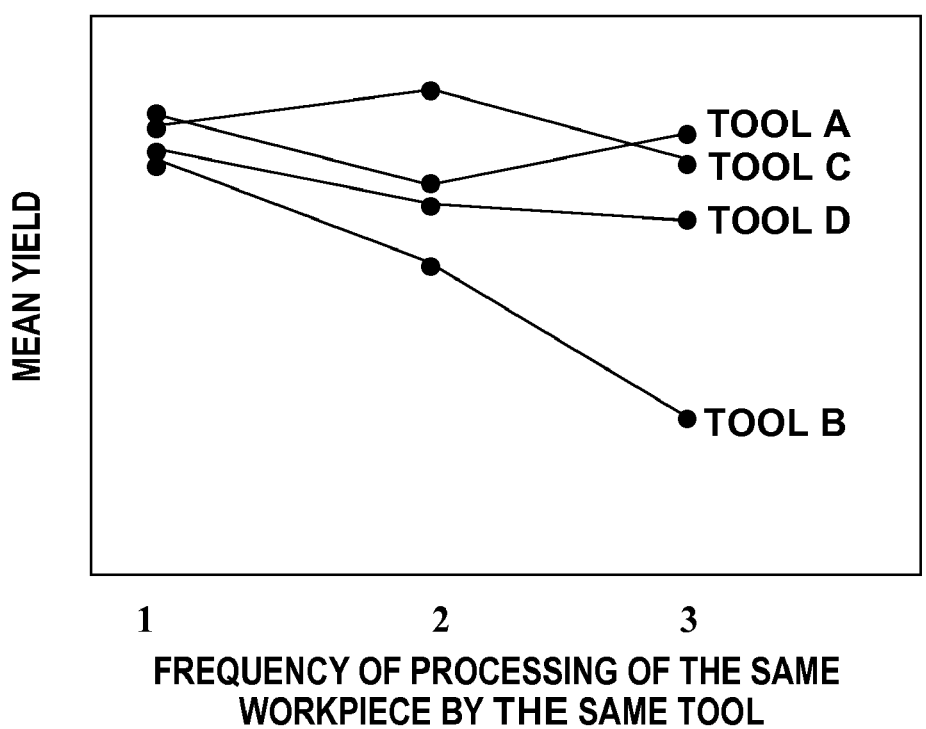
FIG. 4 is a chart showing the performance of a set of four tools on the same graph for workpieces which have been processed once, twice or three times by the same tools.
Figure 5:
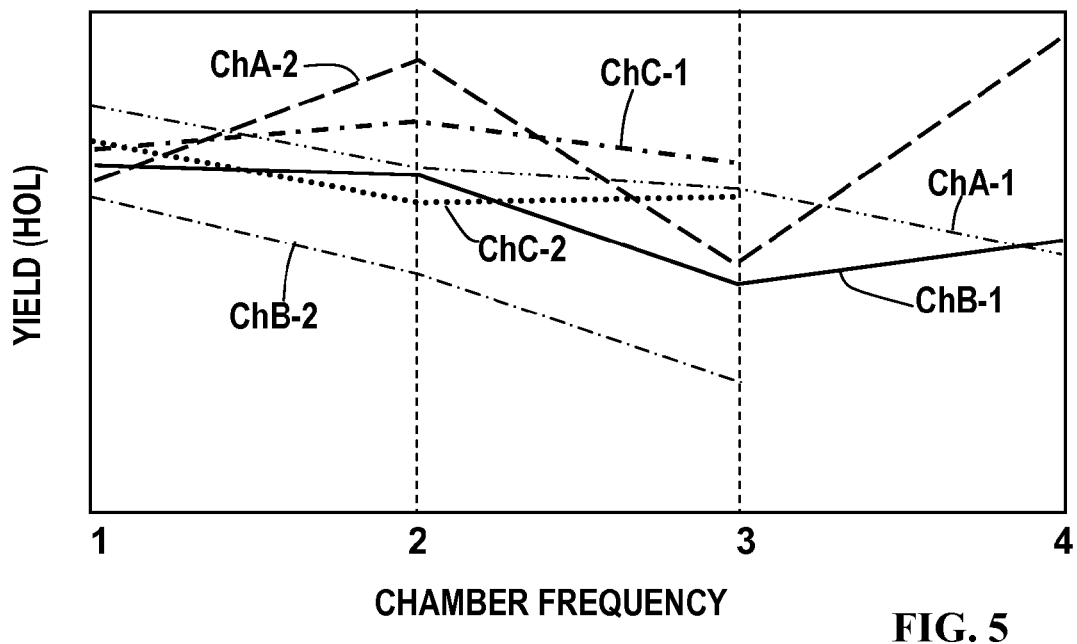
FIG. 5 is a chart showing the performance of many chambers-combinations within a multi-chamber tool
Figure 6:
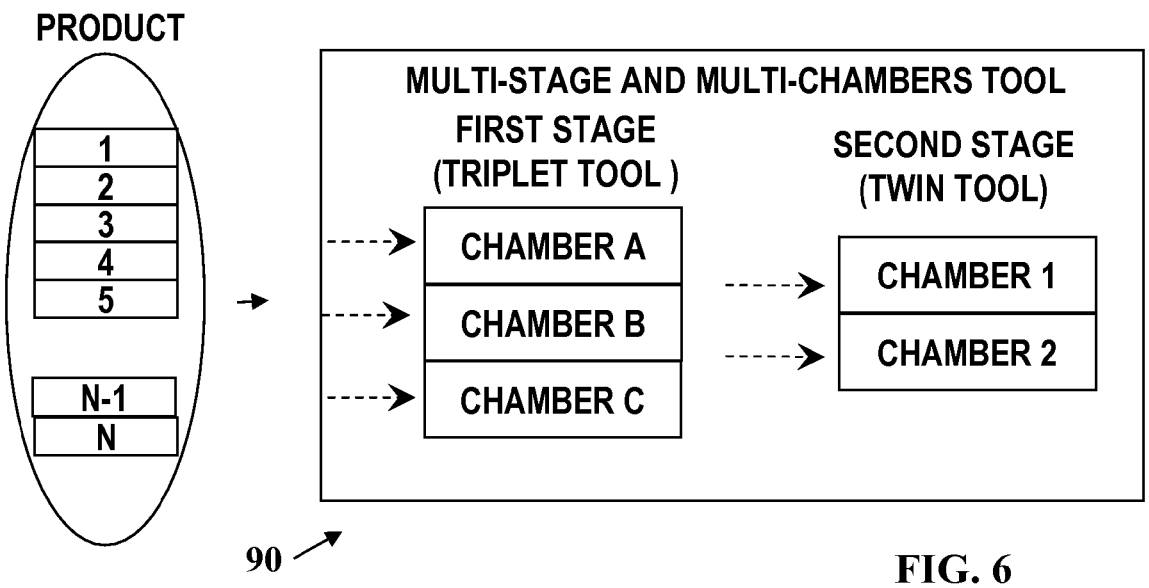
FIG. 6 is a schematic diagram of a multi-stage, multi-chamber tool.

In step CB Yield numbers for each object (product or wafer) exiting a production line are stored in a yield database, as in step AD in FIG. 2 and step BD in FIGS. 3A and 3B.

In step CC statistics are built (as number of times a tool was used, combinations of tools the processed objects have seen, combinations of tool-chambers processed objects have seen) for tool sets (also known as tools that perform same or similar operations, like plating, RIE, Metal depositions, etc) that are used more than once. In this step, the system develops shared statistics for all processes performed on similar tool units with the same capabilities associating a group of numbers with each of the similar tool units.

In step CD Yield numbers are generated for each group of similar tool units based upon the above statistics.

In step CE identify the bad tool units by using the above yield numbers.

Figure 11A:
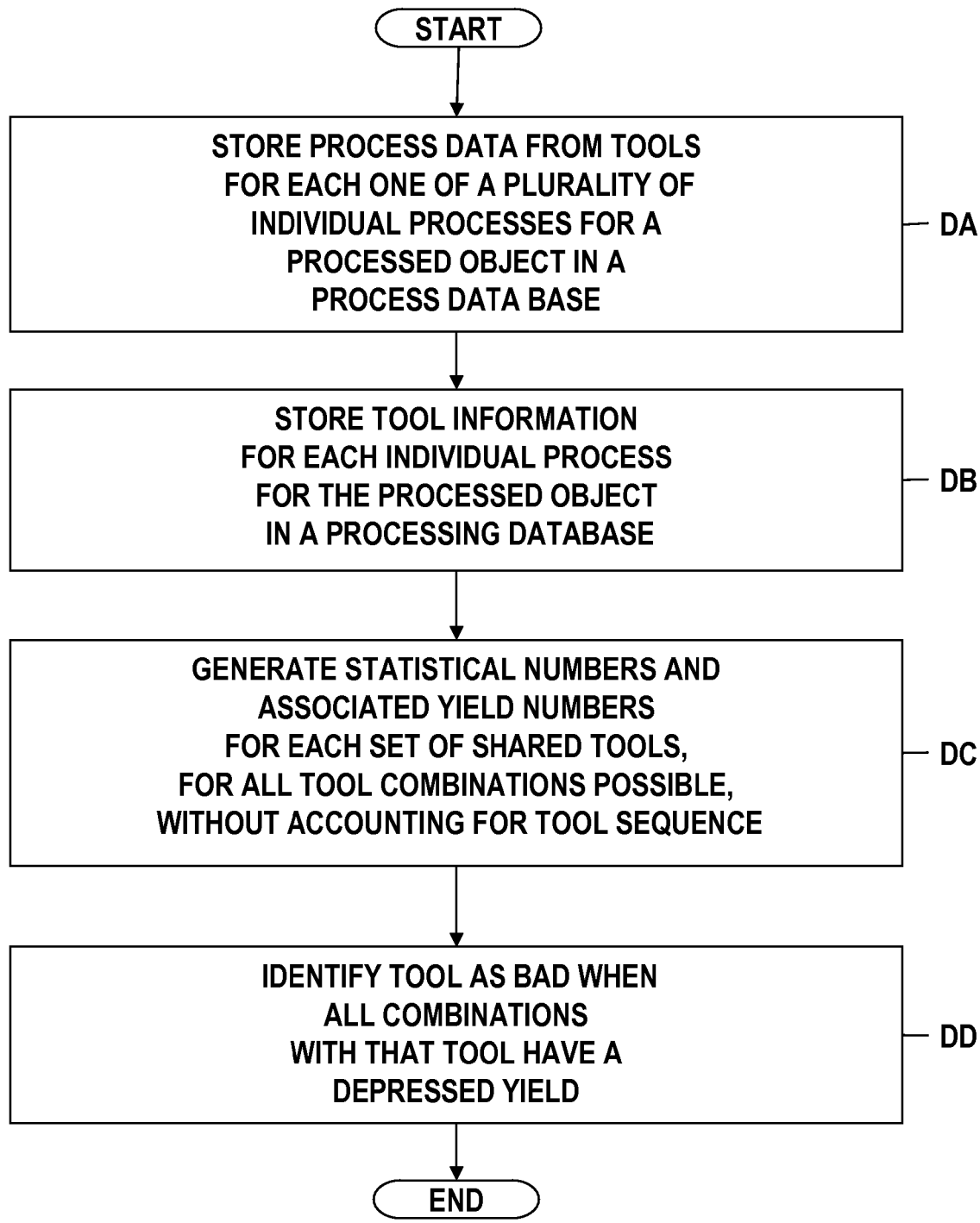
FIGS. 11A and 11B are flow charts illustrating a method for identify a bad tool using the tool combination statistics and analysis, (or tool-chamber combination in case of multi-chamber tools) and yield statistics.
Figure 11B:
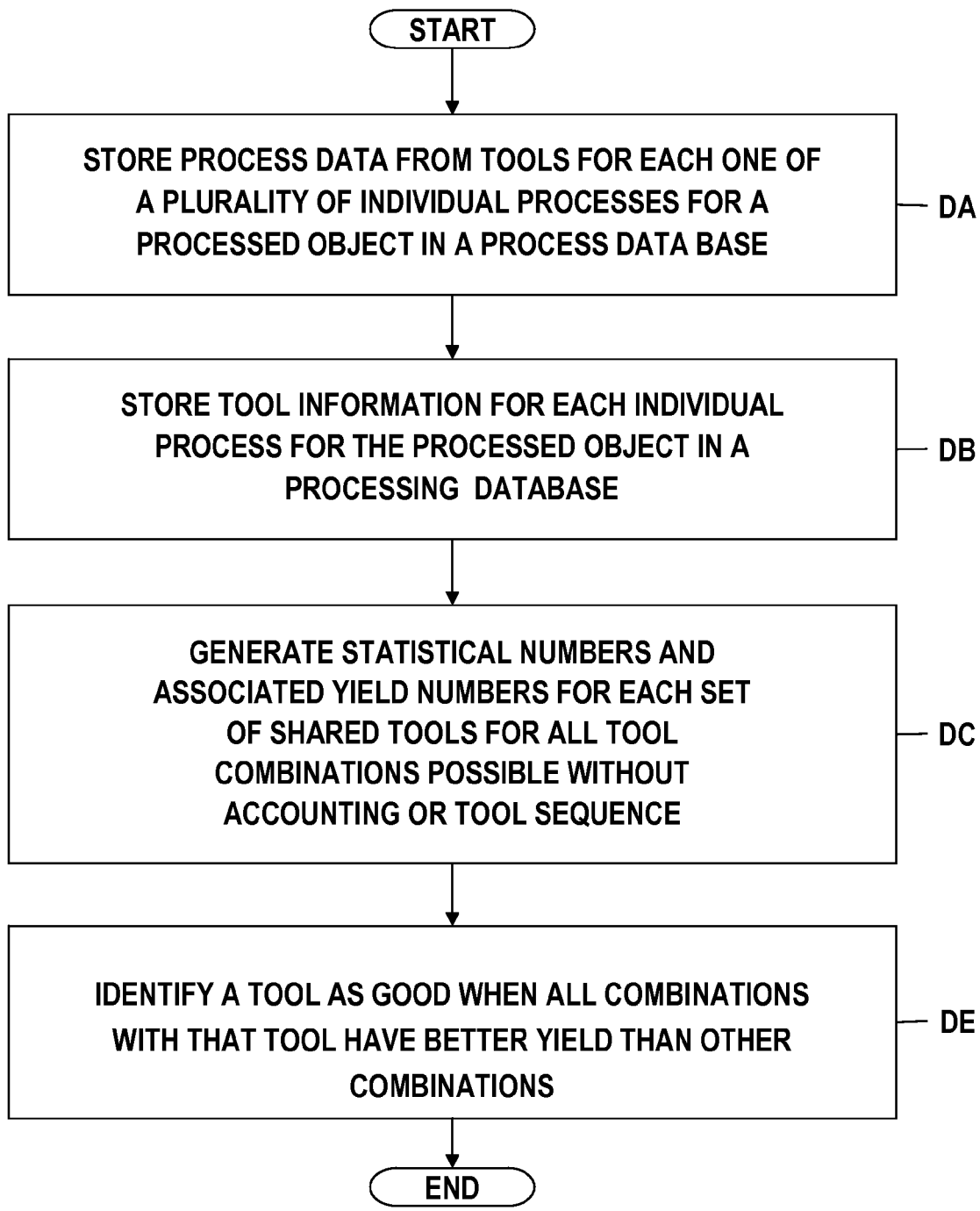

FIGS. 11A and 11B are flow charts illustrating a method for identify a bad tool using the tool combination statistics and analysis, (or tool-chamber combination in case of multi-chamber tools) and yield statistics.

In step DA of FIG. 11A, store process data from tools for each one of a plurality of individual processes for a processed object in a process data base.

In step DB, store tool information for each individual process for the processed object in a processing database.

In step DC, generate statistical numbers and associated yield numbers for each set of shared tools, for all tool combinations possible, without accounting for tool sequence.

In step DD, identify tool as bad when all combinations with that tool have a depressed yield.

In FIG. 11B, steps DA-DC are the same but step DD is replaced by step DE, that identifies a tool as good when all combinations with that tool have an acceptable and/or increased yield.

Figure 12:
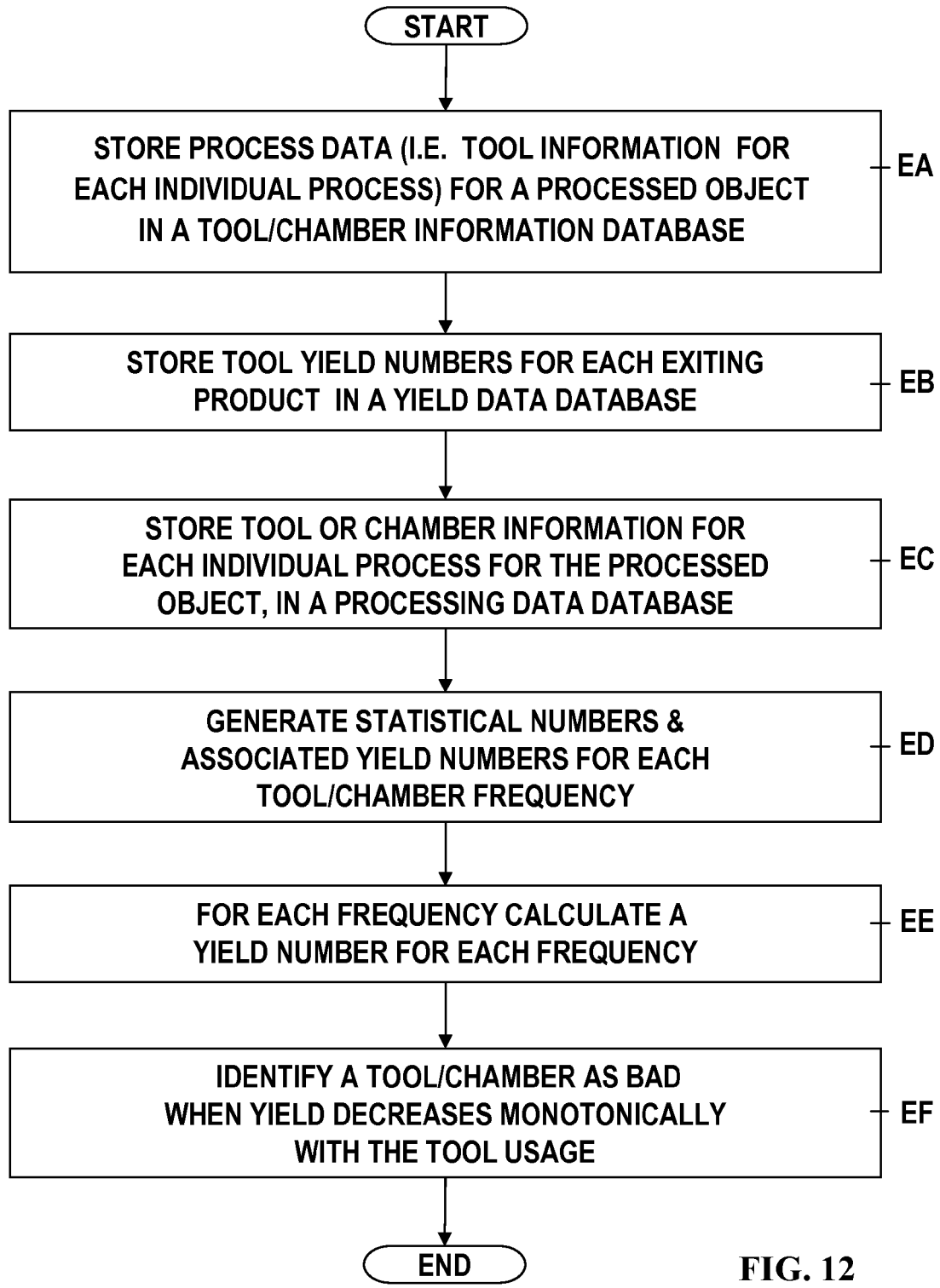
FIG. 12 is a flow chart starting with a step of storing process data from tools (i.e. tool information for each individual process) for each one of a plurality of individual processes for a processed object in a tool/chamber information data base.

FIG. 12 is a flow chart starting with step EA of storing process data from tools (i.e. tool information for each individual process) for each one of a plurality of individual processes for a processed object in a tool/chamber information data base.

In step EB, store tool yield numbers for each exiting product in a yield data database.

In step EC, store tool or chamber information for each individual process for the processed object, in a processing data database.

In step ED, generate statistical numbers and associated yield numbers for each tool/chamber frequency.

In step EE, for each frequency calculate a yield number for each frequency.

In step EF, identify a tool/chamber as bad when yield decreases monotonically with the tool usage.

The most common definition of Yield is the ratio of the number of functional working product divided by the total number of products produced. (2 good out of 5 produced: yield is 2/5 or 0.4 or 40%) Fabricators usually employ a couple of other definitions of Yield as described next.

Yield can be defined for parameters that have numerical values and are measured during (or at the end of) processing flow. For these parameters the fabricator has determined an upper and a lower permissible value called "SPEC." Certain parameter have only a one sided specification (short-circuit, open-circuit, etc.)

Fabricators define Health of Line (HOL) as a simple multiplication of the Yields for a determined set of parameters.

Figure 14:
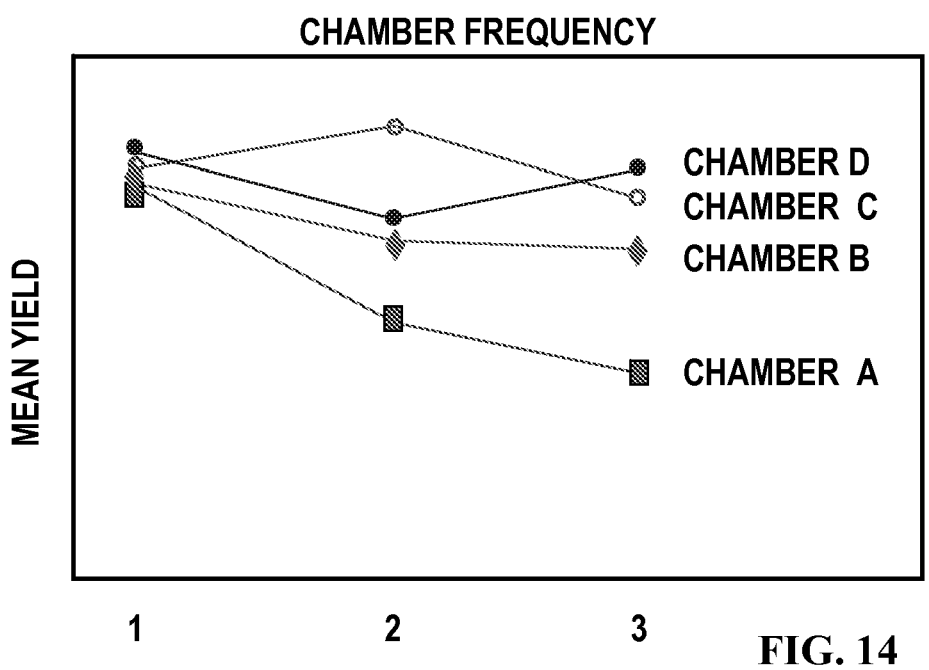
FIG. 14 shows the definitions of yield categories employed in making a yield determination for tools which will fall into the categories for any good yield, average yield, chip perfect yield, or chip perfect yield no incomplete chips.

FIG. 14 shows the definitions of yield categories employed in making a yield determination for tools which will fall into the categories for any good yield, average yield, chip perfect yield, or chip perfect yield no incomplete chips.

FIG. 15 is a chart showing the performance of a multi-chamber tool on the same graph for workpieces which have been processed once, twice or three times by the same chamber of a multi-chamber tool. In this case the tool has four chambers A, B, C and D and the workpiece can be processed by any one of those chambers at a given PASS. FIG. 15 illustrates that as more processing is done by chamber A, the yield is reduced and by fitting a line through the points of chamber A, there is a negative slope (b<0), so chamber A needs engineering action such as stopping, repairs, maintenance, calibration or replacement.

Another aspect of the method of this invention is that it is effective not only when a tool is used for the exactly same process several times in one cycle but can also be used when a tool performs different processes in a product manufacturing cycle.

While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly all such changes come within the purview of the present invention and the invention encompasses the subject matter of the following claims.

Having thus described the invention, what is claimed as new and desirable to be secured by Letters Patent is as follows:

1. A method of determining the quality of performance of tool units wherein a tool unit comprises a unit selected from the group consisting of an individual tool and a tool chamber in a multichamber tool in a manufacturing system, where multiple similar tool units are provided at each of a series of tool stations used in repetitive cycles of processing objects through a production line until completion of manufacturing thereof by said manufacturing system, comprising the steps as follows:

processing objects through said tool stations in said production line repetitively with one of a plurality of tool units at each station being allocated to process one of said objects with one of said tool units on a random basis on each cycle of progress of said object through said production line;

storing process data including tool identification and object identification from each of said tool units which processes one of said objects at a said tool station for each one of a plurality of individual processes for a processed object in a process database, collecting functional test data from manufactured objects at the completion of processing thereof and passing said functional test data for each object to an object yield data processor;

calculating object yield data for each individual ones of said objects based upon said functional test data;

data mining to develop statistics for similar tool units by associating said object yield data with each of said similar tool units;

generating yield numbers for each group of said similar tool units based upon said statistics; and identifying well performing tools and poorly performing tools by using said yield numbers.

2. The method of claim 1 including generating statistical numbers and associated yield numbers for each set of shared tools, for all tool combinations possible, without accounting for tool sequence.

3. The method of claim 1 including:

identifying a poorly performing tool when all combinations with that tool have a depressed yield; and identifying a well performing tool when all combinations with that tool have an acceptable yield.

4. The method of claim 1 including generating statistical numbers and associated yield numbers for each tool/chamber frequency of tool usage.

5. The method of claim 4 including calculating a yield number for each frequency of tool usage.

6. The method of claim 5 including identifying a tool/chamber as performing at an unacceptable level when yield decreases monotonically with frequency of tool usage.

7. The method of claim 1 including:

supplying data from said data collection processor to a logistic data base processor;

supplying data from said logistic database processor to said data mining processor; and employing data mining processing to determine performance of a said tool/chamber.

8. The method of claim 1 including employing SQL to summarize data for each object by tool and lot.

9. The method of claim 8 including creating a frequency of usage table of data by lot, object, and tool.

10. The method of claim 9 including creating an object yield database.

11. The method of claim 10 including forming a composite table by joining said frequency of tool usage table and said object yield database.

12. The method of claim 11 including taking frequency of tool usage as an independent variable and yield as a dependent variable.

13. The method of claim 12 including determining whether tool frequency of usage and tool yield correlate.

14. A system for identifying performance level of at least one chamber and/or at least one stage in a manufacturing system with respect to an acceptable level comprising:

a process database for storing process data from groups of similar tools for each one of a plurality of individual processes for a processed object where said individual processes are performed at each of a series of stations by a tool unit randomly selected from one of said groups of similar tools located a given station;

an object yield database for storing tool performance data for each individual process for a processed object at the end of processing through said manufacturing system;

a data mining processor for developing statistics for each tool in said groups of similar tool units by associating said object yield data with data from said process database for each of said sets of similar tool units;

a yield analyzer which generates yield numbers for each group of said similar tool units based upon said statistics; and a performance analyzer which identifies well and poorly performing tool units in said groups by using said yield numbers.

15. The system of claim 14 wherein said data mining processor generates statistical numbers and associated yield numbers for each set of shared tools, for all tool combinations possible, without accounting for tool sequence.

16. The method of claim 14 wherein said data mining processor identifies a poorly performing tool when all combinations with that tool have a depressed yield.

17. The method of claim 14 wherein said data mining processor identifies a well performing tool when all combinations with that tool have an acceptable yield.

18. The method of claim 14 wherein said data mining processor generates statistical numbers and associated yield numbers for each tool/chamber frequency of usage.

19. The method of claim 18 wherein said data mining processor calculates a yield number for each frequency and identifies a tool/chamber as performing at an unacceptable level when yield decreases monotonically with tool usage.

* * * * *